(12) United States Patent
Nakajima

(10) Patent No.: US 11,019,774 B2
(45) Date of Patent: Jun. 1, 2021

(54) PLANT CULTIVATION DEVICE

(71) Applicant: NATUREDYNE INC., Tokyo (JP)

(72) Inventor: Keiichi Nakajima, Tokyo (JP)

(73) Assignee: NATUREDYNE INC., Tokyo (JP)

( * ) Notice: Subject to any disclaimer, the term of this patent is extended or adjusted under 35 U.S.C. 154(b) by 260 days.

(21) Appl. No.: 16/189,275

(22) Filed: Nov. 13, 2018

(65) Prior Publication Data

US 2019/0082621 A1 Mar. 21, 2019

Related U.S. Application Data

(63) Continuation of application No. 15/538,402, filed as application No. PCT/JP2016/001344 on Mar. 10, 2016, now abandoned.

(30) Foreign Application Priority Data

May 15, 2015 (WO) .................. PCT/JP2015/002466

(51) Int. Cl.
*A01G 27/00* (2006.01)
*A01G 31/00* (2018.01)
(Continued)

(52) U.S. Cl.
CPC .............. *A01G 9/247* (2013.01); *A01G 27/00* (2013.01); *A01G 27/003* (2013.01); *A01G 31/00* (2013.01);
(Continued)

(58) Field of Classification Search
CPC .......... A01G 9/24; A01G 9/245; A01G 27/00; A01G 31/00; A01G 31/02
(Continued)

(56) References Cited

U.S. PATENT DOCUMENTS 3,753,315 A 8/1973 Adam
4,159,595 A 7/1979 Dalle et al.
(Continued)

FOREIGN PATENT DOCUMENTS

CN 103461079 A 12/2013
GB 2322673 A 9/1998
(Continued)

OTHER PUBLICATIONS

International Search Report issued in related International Application No. PCT/JP2016/001344 dated Apr. 12, 2016, 2 pages.
(Continued)

*Primary Examiner* — David J Parsley
(74) *Attorney, Agent, or Firm* — Snyder, Clark, Lesch & Chung, LLP

(57) ABSTRACT

The present invention is a plant cultivation device. The water tank supplies cultivation water to the cultivation tank via an irrigation conduit. The water tank also suctions cultivation water from the cultivation tank via a water-sucking pipe. The heat-collecting part receives sunlight, and the pressure of air that is heated inside the air-storage part presses the surface of the water inside the water tank. The water tank supplies cultivation water that has been pressed by the air to a culture medium material. The heat-collecting part raises the surface of the water inside the water tank as a result of the heated air being cooled by a decrease in the sunlight. The water tank suctions cultivation water from a bottom section of the cultivation tank.

24 Claims, 23 Drawing Sheets

(51) Int. Cl.
    *A01G 31/02*     (2006.01)
    *A01G 9/24*     (2006.01)
    *A01G 24/35*     (2018.01)

(52) U.S. Cl.
    CPC .............. *A01G 31/02* (2013.01); *A01G 9/243* (2013.01); *A01G 24/35* (2018.02); *A01G 27/005* (2013.01); *A01G 2031/006* (2013.01); *Y02A 40/25* (2018.01); *Y02P 60/12* (2015.11); *Y02P 60/21* (2015.11)

(58) Field of Classification Search
    USPC .................... 47/17, 48.5, 59 R, 60, 62 R, 79
    See application file for complete search history.

(56) References Cited

U.S. PATENT DOCUMENTS

| | | | |
|---|---|---|---|
| 4,348,135 A * | 9/1982 | St. Clair | A01G 25/06 |
| | | | 405/131 |
| 4,745,707 A | 5/1988 | Newby | |
| 5,493,808 A * | 2/1996 | Munday | A01G 9/246 |
| | | | 47/60 |
| 5,713,154 A | 2/1998 | Goldstein et al. | |
| 6,006,471 A | 12/1999 | Sun | |
| 6,553,713 B2 | 4/2003 | Chiu | |
| 7,413,380 B2 | 8/2008 | Corwon | |
| 2008/0005962 A1 | 1/2008 | Hashimoto et al. | |
| 2010/0320291 A1 | 12/2010 | Chen | |

FOREIGN PATENT DOCUMENTS

| | | |
|---|---|---|
| GB | 2383384 A | 6/2003 |
| JP | 1985114651 U | 8/1985 |
| JP | 199039651 U | 3/1990 |
| JP | 2003/210040 A | 7/2003 |
| WO | 0101759 A1 | 1/2001 |
| WO | 2006070784 A1 | 7/2006 |
| WO | 2009063219 A1 | 5/2009 |

OTHER PUBLICATIONS

Written Opinion of the International Searching Authority issued in related International Application No. PCT/JP2016/001344 dated Apr. 12, 2016, 9 pages.
Office Action issued in related Chinese Application No. 2016800125358, dated Jun. 12, 2018, 8 pages.
Examination Report issued in related Canadian Application No. 2,973,057, dated Jun. 26, 2018, 4 pages.
Extended European Search Report issued in related European Application No. 16796043.4, dated Jul. 4, 2018, 8 pages.
Examination Report issued in corresponding Australian Application No. 2016263381, dated Jul. 12, 2018, 5 pages.

\* cited by examiner

PLANT CULTIVATION DEVICE

TECHNICAL FIELD

The present invention relates to a plant cultivation device.

BACKGROUND ART

PTL 1 discloses a plant cultivation device that irrigates plants with water by a watering pump. This plant cultivation device further includes a power supply device. The power supply device converts wind or sunlight to electric power and supplies this electric power to the watering pump.

CITATION LIST

Patent Literature

[PTL 1] Japanese Patent Application Laid-open No. 2003-210040

SUMMARY OF INVENTION

Technical Problem

The invention described in PTL 1 enables a reduction in electric power required for maintenance of the plant cultivation device. However, this plant cultivation device additionally requires electric power for controlling the power supply device. In cultivating plants with such a plant cultivation device, it is necessary not only to take care of the plants but also to manage the power supply device. This imposes a large burden on users.

An object of the present invention is to reduce the dependency on external power supply and electric control of plant cultivation devices.

Solution to Problem

[1] The plant cultivation device according to one aspect of the present invention includes a cultivation tank for growing plants, and a solar heat pump system. The solar heat pump system includes a water tank that supplies cultivation water to the cultivation tank via a watering channel. The water tank is also a water tank for suctioning cultivation water from the cultivation tank via a water-sucking pipe. The solar heat pump system further includes a heat-collecting part that has an air-storage part that communicates with an upper section of the water tank. The heat-collecting part receives sunlight and causes the pressure of air heated inside the air-storage part to press the surface of the water inside the water tank. The water tank supplies the cultivation water that has been pressed by the air to a culture medium material. The water tank thus supplies water via the watering channel. The water tank supplies water from above the culture medium material that is arranged inside the cultivation tank. The heat-collecting part raises the surface of the water inside the water tank. This rising of the water level occurs as a result of the heated air being cooled by a decrease of the sunlight. The water tank suctions the cultivation water from a bottom section of the cultivation tank via the water-sucking pipe. This suctioning occurs in accordance with the rising of the cultivation water.

[2] Preferably, the solar heat pump system further includes a discharge check valve that prevents backflow of the cultivation water supplied from the water tank to the cultivation tank. Preferably, the solar heat pump system further includes a suction check valve that prevents backflow of the cultivation water suctioned from the cultivation tank to the water tank. The discharge check valve and the suction check valve preferably have a valve member with a specific gravity larger than the cultivation water. This valve member preferably has a downwardly tapered conical shape. These check valves preferably further have a valve seat with a funnel-like shape. This funnel-like shape preferably has a downwardly tapered shape conforming to the shape of the valve member.

Preferably, the pressure of the cultivation water whose surface has been pressed by the heat-collecting part inside the water tank exceeds the pressure of the cultivation water inside the watering channel. This preferably causes the valve member and the valve seat of the discharge check valve to separate from each other. Preferably, this opens the watering channel Meanwhile, preferably, the water-sucking pipe is shut by the valve member and the valve seat of the suction check valve making surface contact with each other due to gravity, as well as by the pressure of the cultivation water whose surface has been pressed by the heat-collecting part inside the water tank exceeding the pressure of the cultivation water inside the water-sucking pipe. Preferably, as a result of this, the cultivation water inside the water tank is fed to the cultivation tank through the watering channel Preferably, the pressure of the cultivation water whose surface has been raised by the heat-collecting part inside the water tank falls below the pressure of the cultivation water inside the water-sucking pipe. This preferably causes the valve member and the valve seat of the suction check valve to separate from each other. Preferably, this opens the water-sucking pipe. Meanwhile, preferably, the watering channel is shut by the valve member and the valve seat of the discharge check valve making surface contact with each other due to gravity, as well as by the pressure of the cultivation water whose surface has been raised by the heat-collecting part inside the water tank falling below the pressure of the cultivation water inside the watering channel. Preferably, as a result of this, the cultivation water is fed from the cultivation tank through the water-sucking pipe in accordance with the rising of the cultivation water inside the water tank.

[3] The discharge check valve and the suction check valve are preferably located outside the water tank. Preferably, these check valves are detachable for the watering channel and the water-sucking pipe.

[4] The discharge check valve and the suction check valve each preferably further include a cover and a base. The base preferably has the valve seat. The valve member is preferably disposed between the cover and the valve seat. The cover and the base preferably have threads. Preferably, threads of the cover are removably mated with threads of the base.

[5] The plant cultivation device preferably further includes a water replenishing device that replenishes the cultivation water to the cultivation tank. This replenishment preferably takes place via a filter material disposed in the bottom section of the cultivation tank. The water replenishing device preferably has a water refill tank that stores the cultivation water. The water replenishing device preferably further includes a suction pressure part that replenishes the cultivation water to the cultivation tank via the filter material. The water replenishing device preferably further includes a water refill tube that feeds the cultivation water stored in the water refill tank into an upper space of the suction pressure part. Replenishment of the cultivation water by the suction pressure part preferably causes a drop of the water level inside the suction pressure part. This preferably causes the cultivation water inside the water refill tank to be fed into the upper space of the suction pressure part.

[6] The suction pressure part is preferably a separate body from the cultivation tank.

[7] Alternatively, the suction pressure part and the cultivation tank are preferably integrated, sharing the walls. In this case, the filter material preferably extends to a bottom section of the suction pressure part.

[8] Preferably, a plurality of the water refill tanks are disposed stepwise. The water refill tanks are preferably arranged such that there is a water level difference between one of the water refill tanks and another of the water refill tanks. An upper-side water refill tank is preferably provided with a water supply means. This water supply means preferably supplies the cultivation water in the upper-side water refill tank to a lower-side water refill tank.

[9] The water replenishing device preferably further includes an adjuster provided to the water refill tube. The adjuster preferably adjusts the flow rate of the cultivation water inside the water refill tube.

[10] The cultivation tank preferably further includes a supporter that supports a culture medium material. The supporter is preferably disposed inside the cultivation tank. The supporter preferably has an upwardly or downwardly tapered funnel-like shape. The supporter, by having this funnel-like shape, preferably forms a space between the filter material and a bottom part of the culture medium material.

[11] The plant cultivation device preferably includes two or more cultivation tanks. The plant cultivation device preferably includes one heat-collecting part that communicates with the two or more cultivation tanks. The plant cultivation device preferably further includes an air feed pipe that communicates the heat-collecting part with the water tank. The air feed pipe preferably allows the pressure of the air heated by the heat-collecting part to travel to the water tank. The air feed pipe preferably allows the pressure of the air cooled by the heat-collecting part to travel to the water tank. The heat-collecting part preferably conveys changes of the pressure of the heated air to the water tank through the air feed pipe. This preferably causes the heat-collecting part to press the surface of the water inside the water tank with the pressure of the heated air. The heat-collecting part preferably conveys changes of the pressure of the cooled air to the water tank through the air feed pipe. This preferably causes the heat-collecting part to raise the surface of the water inside the water tank with the pressure of the cooled air.

[12] The heat-collecting part preferably includes a heat-collecting body positioned inside the air-storage part.

[13] The culture medium material preferably has an upwardly tapered conical shape. The culture medium material preferably has restorability in a direction in which a distal end of the conical shape appears above the water surface when the culture medium material is floating on the cultivation water. The culture medium material preferably has a seed receiving part at the distal end where a seed of the plant is embedded. The culture medium material preferably expands when immersed in the cultivation water.

[14] The plant cultivation device preferably further includes a water replenishing device that replenishes the cultivation water to the cultivation tank via a filter material arranged in the bottom section of the cultivation tank. The water replenishing device preferably includes a water refill tank that stores the cultivation water, a water storage part that replenishes the cultivation water to the cultivation tank via the filter material, a suction pressure part that communicates with the water storage part and is positioned higher than the water storage part so as to feed the cultivation water to the water storage part by gravity, and a water refill tube that feeds the cultivation water stored in the water refill tank into an upper space of the suction pressure part. Preferably, the cultivation water in the water refill tank is fed into the upper space of the suction pressure part by a drop of the water level inside the suction pressure part caused by replenishment of the cultivation water by the suction pressure part.

[15] The plant cultivation device preferably further includes a discharge check valve that prevents backflow of the cultivation water supplied from the water tank to the cultivation tank, a suction check valve that prevents backflow of the cultivation water suctioned from the cultivation tank to the water tank, a connection pipe that connects the discharge check valve and the suction check valve, and a water inlet pipe that connects a middle portion of the connection pipe with the water tank.

Preferably, the water-sucking pipe is shut by the suction check valve being closed by the pressure of the cultivation water whose surface has been pressed by the heat-collecting part inside the water tank exceeding the pressure of the cultivation water inside the water-sucking pipe. Preferably, the watering channel is opened by the discharge check valve being opened by the pressure of the cultivation water whose surface has been pressed by the heat-collecting part inside the water tank exceeding the pressure of the cultivation water inside the watering channel, as a result of which the cultivation water in the water tank is fed to the cultivation tank through the watering channel. Preferably, the watering channel is shut by the discharge check valve being closed by the pressure of the cultivation water whose surface has been raised by the heat-collecting part inside the water tank falling below the pressure of the cultivation water inside the watering channel Preferably, the water-sucking pipe is opened by the suction check valve being opened by the pressure of the cultivation water whose surface has been raised by the heat-collecting part inside the water tank falling below the pressure of the cultivation water inside the water-sucking pipe, as a result of which the cultivation water is fed from the cultivation tank through the water-sucking pipe in accordance with the rising of the cultivation water in the water tank.

[16] The plant cultivation device preferably further includes a discharge check valve that prevents backflow of the cultivation water supplied from the water tank to the cultivation tank, and a suction check valve that prevents backflow of the cultivation water suctioned from the cultivation tank to the water tank. The discharge check valve and the suction check valve each preferably be formed of a valve member having a flexible bill part. The bill part preferably has a slit and a notch on an upper side at a distal end of the bill part. The slit is preferably provided only in the notch positioned at the center of the upper side.

Preferably, the water-sucking pipe is shut by the slit of the suction check valve being closed by the pressure of the cultivation water whose surface has been pressed by the heat-collecting part inside the water tank exceeding the pressure of the cultivation water inside the water-sucking pipe. Preferably, the watering channel is opened by the slit of the discharge check valve being opened by the pressure of the cultivation water whose surface has been pressed by the heat-collecting part inside the water tank exceeding the pressure of the cultivation water inside the watering channel, as a result of which the cultivation water in the water tank is fed to the cultivation tank through the watering channel Preferably, the watering channel is shut by the slit of the discharge check valve being closed by the pressure of the cultivation water whose surface has been raised by the heat-collecting part inside the water tank falling below the pressure of the cultivation water inside the watering channel Preferably, the water-sucking pipe is opened by the slit of the suction check valve being opened by the pressure of the cultivation water whose surface has been raised by the heat-collecting part inside the water tank falling below the pressure of the cultivation water inside the water-sucking pipe, as a result of which the cultivation water is fed from the cultivation tank through the water-sucking pipe in accordance with the rising of the cultivation water in the water tank.

[17] The plant cultivation device preferably includes two or more cultivation tanks. The watering channel is preferably a duct that has branches and distributes water to each of the two or more cultivation tanks by branching. A sponge is preferably mounted at a discharge port of the watering channel that leads to the cultivation tank.

[18] The plant cultivation device preferably includes a water replenishing device that replenishes the cultivation water to the cultivation tank via a filter material arranged in the bottom section of the cultivation tank. The water replenishing device preferably includes a water refill tank that stores the cultivation water, a suction pressure part that feeds the cultivation water to the cultivation tank via the filter material, and a water refill tube that feeds the cultivation water stored in the water refill tank into an upper space of the suction pressure part. Preferably, the cultivation water in the water refill tank is fed into the upper space of the suction pressure part by a drop of the water level in the suction pressure part caused by replenishment of the cultivation water by the suction pressure part. The plant cultivation device preferably includes a water feeder that communicates with the water refill tank and supplies the cultivation water to the water replenishing device. The water feeder preferably has a ballcock.

[19] The plant cultivation device preferably further includes another one of the water replenishing device. The water refill tank of another one of the water replenishing device preferably communicates indirectly with the water feeder via the water refill tank that communicates with the water feeder.

[20] The culture medium material preferably includes gel particles containing a fertilizer component.

Advantageous Effects of Invention

The present invention enables a plant cultivation device to reduce its dependency on electric power and electric control.

DESCRIPTION OF EMBODIMENTS

Figure 1:
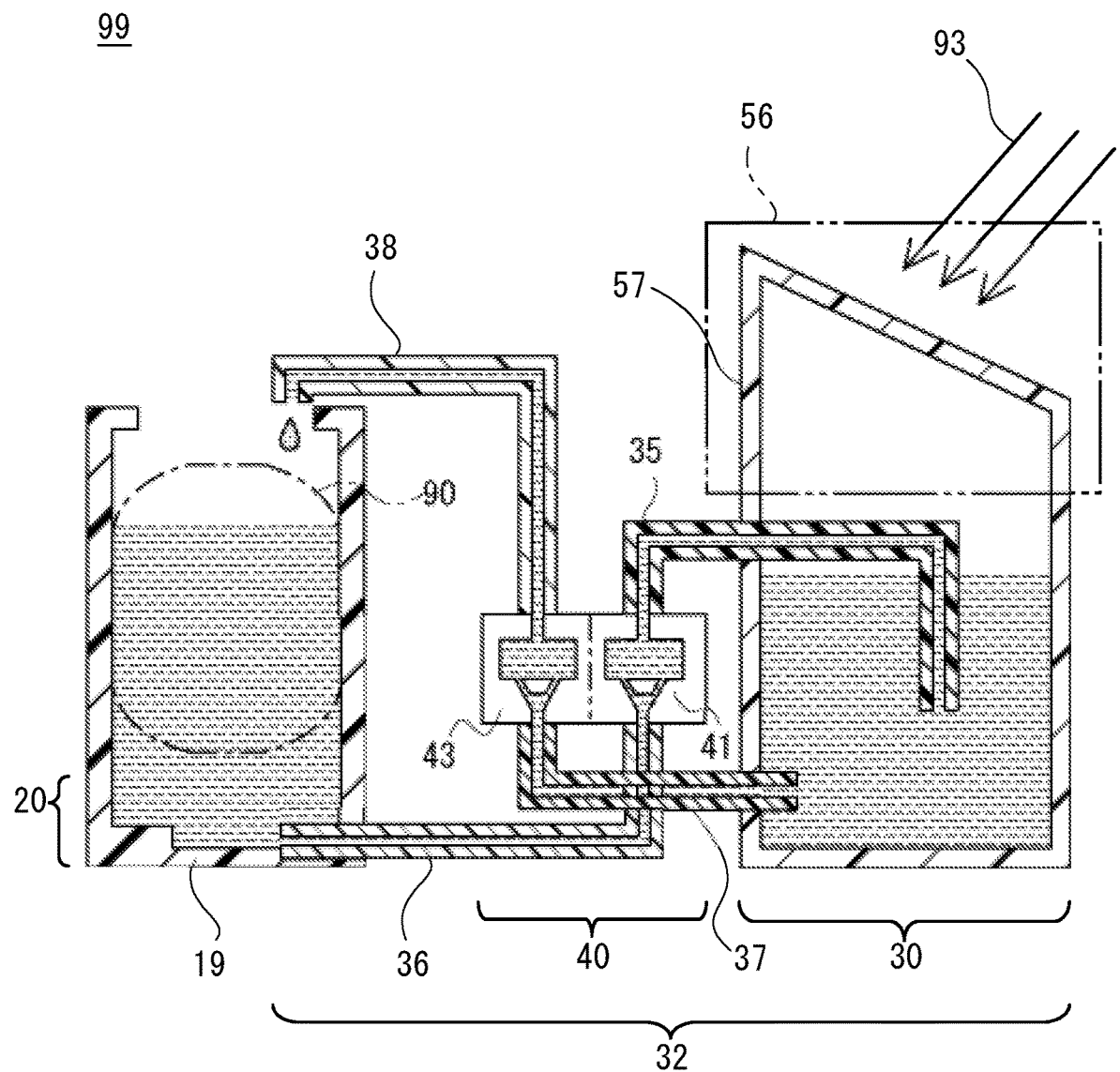
FIG. 1 is an end view of a plant cultivation device according to one embodiment.

Embodiments and examples of the present invention will now be described with reference to the drawings. Constituent elements that are equivalent to each other in the drawings are given the same reference numerals to omit redundant description of these elements. Hatching is partly omitted in end faces of the drawings for better visibility.

FIG. 1 shows a device 99, which is a plant cultivation device according to an embodiment. In the drawing, illustration of an intersecting point between a water inlet pipe 37 and a water-sucking pipe 36 is simplified. The device 99 includes a cultivation tank 19 and a solar heat pump system 32. The solar heat pump system 32 includes a water tank 30. The water tank 30 supplies cultivation water to the cultivation tank 19 via a watering channel 38. The water tank 30 suctions the cultivation water from the cultivation tank 19 via the water-sucking pipe 36.

Cultivation water herein includes nutrient solutions. Nutrient solution herein refers to water, to which ions, minerals, and other nutrients are added as required, and which is suited to the growth of plants as the plants absorb this nutrient solution from the roots. Cultivation water herein includes water that substantially does not contain these nutrients. In the following description, unless otherwise specified, cultivation water may sometimes be referred to as simply "water".

The solar heat pump system 32 shown in FIG. 1 further includes a heat-collecting part 56. The heat-collecting part 56 has an air-storage part 57. The air-storage part 57 communicates with an upper section of the water tank 30.

The heat-collecting part 56 presses the surface of the water inside the water tank 30 with air pressure. The air pressure is generated by the heat-collecting part 56 receiving solar light, or sunlight 93, and heating the air inside the air-storage part 57.

The water tank 30 shown in FIG. 1 supplies the water that has been pressed by the air to a culture medium material 90. The water tank 30 thus supplies water via the watering channel 38. The water tank 30 supplies water from above the culture medium material 90 that is arranged inside the cultivation tank 19.

The heat-collecting part 56 shown in FIG. 1 raises the surface of the water inside the water tank 30. This rising of the water level occurs as a result of the heated air being cooled by a decrease of the sunlight 93. The water tank 30 suctions water from a bottom section of the cultivation tank 19 via the water-sucking pipe 36. This suctioning occurs in accordance with the rising of the water mentioned above.

As shown in FIG. 1, the solar heat pump system 32 suctions water from outside the system, raises the water level inside the system, and discharges the water out of the system. The solar heat pump system 32 obtains energy necessary for this movement of water with the heat-collecting part 56. Preferably, the solar heat pump system 32 does not include an electric pump.

The solar heat pump system 32 shown in FIG. 1 further includes a discharge check valve 43 that prevents backflow of the water supplied from the water tank 30 to the cultivation tank 19. The solar heat pump system 32 further includes a suction check valve 41 that prevents backflow of the water suctioned from the cultivation tank 19 to the water tank 30.

The device 99 shown in FIG. 1 requires substantially no manpower for watering. This is because watering can be achieved by the cycle of sunlight as described above. With the use of the device 99, plants can be grown at lower cost than common hydroponics methods. This is because the device 99 hardly relies or relies less on electric power or electronic control as compared to devices needed for hydroponics.

Example 1

Figure 2:
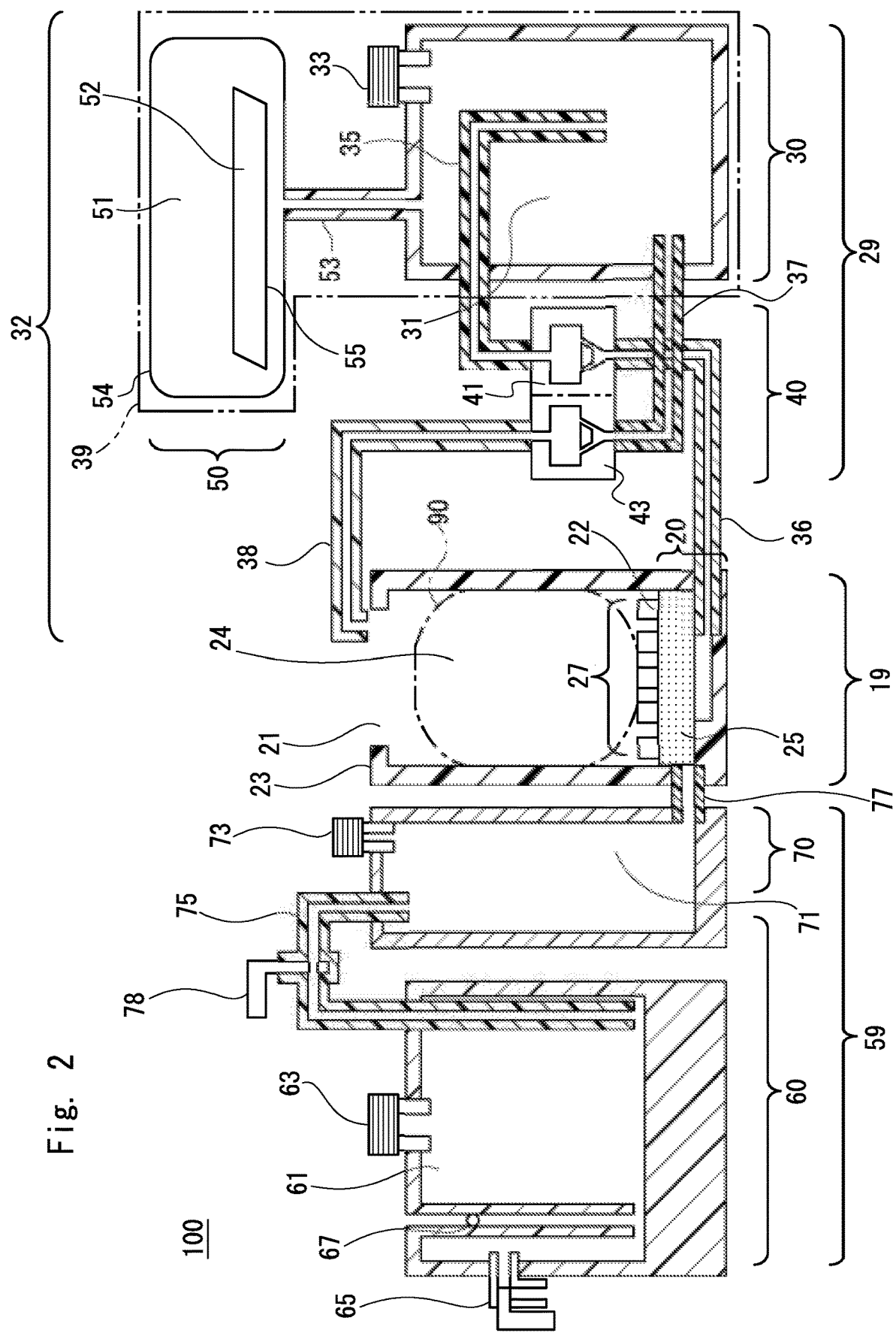
FIG. 2 is an end view of a plant cultivation device according to Example 1.

FIG. 2 is an end view of a device 100 according to Example 1. In the drawing, illustration of an intersecting point between a water inlet pipe 37 and a water-sucking pipe 36 is simplified. The device 100 is a water-circulating plant cultivation device. The device 100 includes a cultivation tank 19, a pump 29, and a water replenishing device 59. Water circulates between the cultivation tank 19 and the pump 29 as will be described later.

The cultivation tank 19 shown in FIG. 2 has a bottom section 20 and an upper face opening 21. The cultivation tank 19 has a body part 23 provided as walls. The body part 23 extends from the bottom section 20 to the upper face opening 21. The body part 23 is preferably cylindrical. The inner cavity 24 of the cultivation tank 19 consists mainly of the hollow cavity in the center of the body part 23.

The cultivation tank 19 shown in FIG. 2 includes a supporter 27. The supporter 27 supports a culture medium material 90. The culture medium material 90 will be described in detail later. The supporter 27 is arranged in the inner cavity 24. The supporter 27 is preferably arranged closer to the bottom section 20 than to the upper face opening 21. This way, the cultivation tank 19 can accommodate a larger culture medium material 90.

The filter material 25 shown in FIG. 2 is arranged in the bottom section 20. The filter material 25 is interposed between the inner cavity 24 and the water-sucking pipe 36. The filter material 25 is preferably a porous material including zeolite. The filter material 25 is preferably packed in a mesh bag (not shown). The upper face 22 of the filter material 25 faces the inner cavity 24. The filter material 25 may be fixed to the bottom section 20 by the supporter 27 pressing down on the upper face 22.

The pump 29 shown in FIG. 2 has a pump chamber 39 and a pair of check valves 40. The pair of check valves 40 has a suction check valve 41 and a discharge check valve 43. At least one of the suction check valve 41 and the discharge check valve 43 is preferably a gravity check valve. The suction check valve 41 and discharge check valve 43 may be spring check valves.

The suction check valve 41 shown in FIG. 2 prevents creation of a water flow that travels from the inner cavity 31 of the water tank 30 toward the water-sucking pipe 36 without going through the cultivation tank 19. The discharge check valve 43 prevents creation of a water flow that travels from the inner cavity 31 toward the watering channel 38 without going through the cultivation tank 19. The suction check valve 41, water tank 30, and discharge check valve 43 are arranged such that the water flows through the suction check valve 41, water tank 30, and discharge check valve 43 in this order.

At least one of the suction check valve 41 and discharge check valve 43 shown in FIG. 2 is disposed outside the pump chamber 39. Preferably, both of the suction check valve 41 and discharge check valve 43 are disposed outside the pump chamber 39. Even more preferably, the suction check valve 41 and discharge check valve 43 are coupled to each other. Such a pair of check valves 40 can be replaced easily.

The pair of check valves 40 shown in FIG. 2 may be a group of check valves. The group of check valves may include a plurality of suction check valves 41. The group of check valves may include a plurality of discharge check valves 43.

Figure 3:
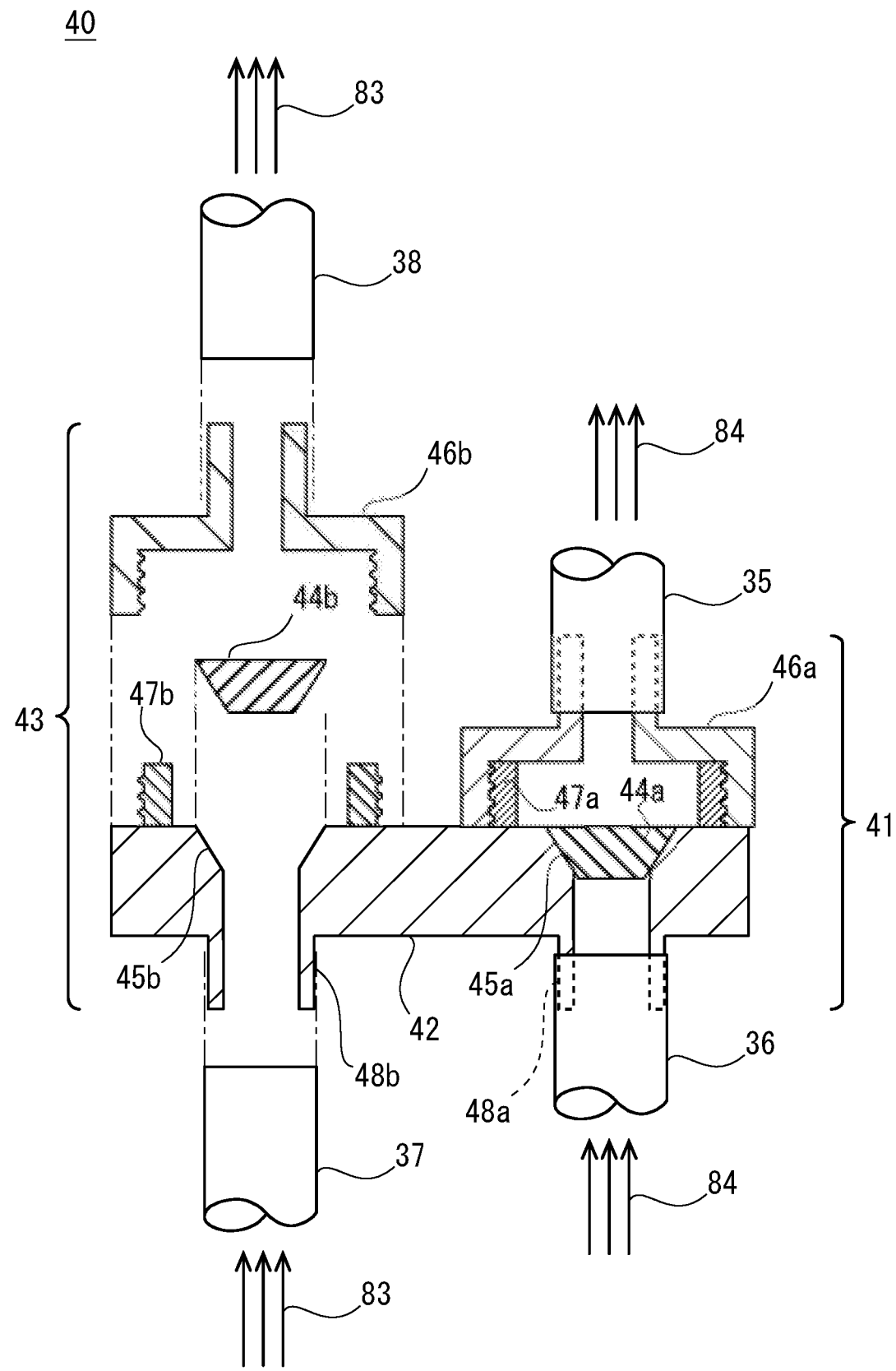
FIG. 3 is an assembly diagram of a check valve according to Example 1.

FIG. 3 is an assembly diagram of one example of a pair of check valves 40. The suction check valve 41 and discharge check valve 43 may have the same configuration as shown in the drawing. An end face of the suction check valve 41 before assembly is represented on the right side of the drawing. An end face of the discharge check valve 43 after assembly is represented on the left side of the drawing. Above and below the pair of check valves 40 are shown side faces of respective ends of pipes connected to the check valves.

The pair of check valves 40 shown in FIG. 3 includes a base 42, valve members 44a and 44b, and covers 46a and 46b. The base 42 includes valve seats 45a and 45b, rings 47a and 47b, and joints 48a and 48b. The valve seat 45a and ring 47a of the suction check valve 41 are formed on the upper face of the base 42. The valve seat 45b and ring 47b of the discharge check valve 43 are formed on the upper face of the base 42. The rings 47a and 47b surround the valve seats 45a and 45b, respectively.

The joint 48a of the suction check valve 41 and the joint 48b of the discharge check valve 43 shown in FIG. 3 are formed on the lower face of the base 42. The joints 48a and 48b communicate with the valve seats 45a and 45b, respectively. The valve seats 45a and 45b have a downwardly tapered funnel-like shape.

Threads are formed in the base 42 shown in FIG. 3. The threads are preferably provided on the outer surface of the rings 47a and 47b. The valve members 44a and 44b have a downwardly tapered conical shape. The valve members 44a and 44b have a specific gravity larger than that of cultivation water. Preferably, the specific gravity of the valve members 44a and 44b is larger than that of pure water. The conical outer surface of the valve member 44a and the funnel-like inner surface of the valve seat 45a preferably make tight contact with each other.

To assemble the pair of check valves 40 shown in FIG. 3, the valve members 44a and 44b are disposed between the cover 46a and the valve seat 45a, and between the cover 46b and the valve seat 45b, respectively. The valve members 44a and 44b are received in the valve seats 45a and 45b through the center of the rings 47a and 47b. Threads are formed in the inner surface of the covers 46a and 46b. Thus the threads of the covers 46a and 46b are mated with the threads of the rings 47a and 47b.

These threads noted above allow the covers 46a and 46b shown in FIG. 3 to be removably mated with the rings 47a and 47b. Accordingly, the suction check valve 41 and discharge check valve 43 can be produced in an efficient manner. The covers 46a and 46b can be removed from the base 42 by loosening the threads. Therefore, the valve members 44a and 44b and valve seats 45a and 45b can be cleaned.

The arrows in FIG. 3 indicate the directions of water flows 83 and 84 coming in and out of the pair of check valves 40. The water inlet pipe 35 connects to the cover 46a of the suction check valve 41. Water is fed from the cover 46a to the water inlet pipe 35. The water-sucking pipe 36 connects to the joint 48a. Water is fed from the water-sucking pipe 36 to the joint 48a. Therefore, a water flow 84 is created, which travels from the water-sucking pipe 36 shown in FIG. 2 toward the water tank 30, and thus the water is suctioned from the cultivation tank 19.

When the water tries to flow in the opposite direction from that of the water flow 84 shown in FIG. 3, the valve member 44a makes surface contact with the valve seat 45a and stops the water. Even when there is no such water flow, the valve member 44a sinks by gravity and makes surface contact with the valve seat 45a to stop the water. In addition, the valve member 44a and the valve seat 45a make tight contact with each other because of the pressure of the cultivation water whose surface has been pressed by the heat-collecting part inside the water tank exceeding the pressure of the cultivation water inside the water-sucking pipe 36. As the valve member 44a and the valve seat 45a make tight contact, water leakage from the water tank 30 to the water-sucking pipe 36 is prevented.

The water inlet pipe 37 connects to the joint 48b of the discharge check valve 43 shown in FIG. 3. Water is fed from the water inlet pipe 37 to the joint 48b. The pipe that forms the watering channel 38 connects to the cover 46b. Water is fed from the cover 46b to the watering channel 38. Therefore, a water flow 83 is created, which travels from the water tank 30 shown in FIG. 2 toward the watering channel 38, and thus the water is discharged into the cultivation tank 19.

When the water tries to flow in the opposite direction from that of the water flow 83 shown in FIG. 3, the valve member 44b makes surface contact with the valve seat 45b and stops the water. Even when there is no such water flow, the valve member 44b sinks by gravity and makes surface contact with the valve seat 45b to stop the water. In addition, the valve member 44b and the valve seat 45b make tight contact with each other because of the pressure of the cultivation water whose surface has been raised by the heat-collecting part inside the water tank falling below the pressure of the cultivation water inside the watering channel 38. As the valve member 44b and the valve seat 45b make tight contact, water leakage from the watering channel 38 to the water tank 30 is prevented.

The discharge check valve 43 shown in FIG. 3 is detachable for the water inlet pipe 37 and watering channel 38. The suction check valve 41 is detachable for the water inlet pipe 35 and water-sucking pipe 36. Therefore, the suction check valve 41 and discharge check valve 43 are readily replaced. If the suction check valve 41 and discharge check valve 43 are separate components, the suction check valve 41 and discharge check valve 43 can be individually replaced.

Referring back to FIG. 2, the pump chamber 39 shown in FIG. 2 has the water tank 30 and an air tank 50. The water tank 30 has a sealing plug 33 and an air feed pipe 53. The inner cavity 31 of the water tank 30 and the inner cavity 51 of the air tank 50 communicate with each other via the air feed pipe 53. The inner cavity 31 and inner cavity 51 shown in FIG. 2 may be connected without the air feed pipe 53 and they may for example form a single space. This example is represented in FIG. 1 described above.

The water tank 30 shown in FIG. 2 is connected to the suction check valve 41 and discharge check valve 43. The pump 29 includes the water inlet pipes 35 and 37 mentioned above. One end of the water inlet pipe 35 connects to the discharge side of the suction check valve 41. One end of the water inlet pipe 37 connects to the suction side of the discharge check valve 43. The other ends of the water inlet pipes 35 and 37 connect to the inner cavity 31.

The air tank 50 shown in FIG. 2 functions similarly to the heat-collecting part 56 shown in FIG. 1. The air tank 50 has a heat-collecting surface 52. The heat-collecting surface 52 is a surface that collects the solar heat. The heat-collecting surface 52 absorbs the solar heat, and thus can release heat into the inner cavity 51. The heat-collecting surface 52 may be positioned on the outer surface of the air tank. The solar heat reaches the heat-collecting surface as solar rays or solar heat waves. These will be hereinafter referred to simply as solar heat.

The air tank 50 shown in FIG. 2 has a container 54 and a heat-collecting body 55. The container 54 functions similarly to the air-storage part 57 shown in FIG. 1. The inner cavity of the container 54 is the inner cavity 51. The heat-collecting body 55 has the heat-collecting surface 52. The heat-collecting body 55 is positioned in the inner cavity 51. The container 54 in this case is partly or entirely transparent. The heat-collecting body 55 contacts the air inside the inner cavity 51. Thus the air tank 50 can heat the air inside the air tank 50 efficiently.

If the container 54 shown in FIG. 2 is transparent, the heat-collecting surface 52 may be positioned on the inner surface of the container 54 (not shown). The heat-collecting surface 52 may be positioned on the outer surface of the container 54 (not shown). The heat-collecting surface 52 in this case may receive solar heat, solar rays, or solar heat waves that have transmitted through the transparent container 54.

The device 100 shown in FIG. 2 includes the water-sucking pipe 36 and watering channel 38 mentioned above. The water-sucking pipe 36 connects the bottom section 20 of the cultivation tank 19 with the suction check valve 41 of the pump 29. The water-sucking pipe 36 connects to the suction side of the suction check valve 41.

The watering channel 38 shown in FIG. 2 extends from the discharge check valve 43 of the pump 29 as far as to reach the upper face opening 21 of the cultivation tank 19. The watering channel 38 connects to the discharge side of the discharge check valve 43. The watering channel 38 may extend from the discharge check valve 43 as far as to reach the inner cavity 24. The pump chamber 39 is made airtight by closing the sealing plug 33 and the pair of check valves 40.

The water replenishing device 59 shown in FIG. 2 connects to the bottom section 20 of the cultivation tank 19. The water replenishing device 59 replenishes water to the cultivation tank 19. The water replenishing device 59 has a water refill tank 60 and a suction pressure tank 70. The suction pressure tank 70 forms a suction pressure part. The water refill tank 60 includes a refill port 63, a discharge pipe 65, and a water level indicator 67. A cock is provided to the discharge pipe 65.

The suction pressure tank 70 shown in FIG. 2 has an outer shell 72 and a sealing plug 73. The suction pressure tank 70 has a suction pressure chamber 71. The suction pressure chamber 71 is surrounded by the outer shell 72. The suction pressure chamber 71 can be kept airtight by introducing water therein and closing the sealing plug 73.

The water replenishing device 59 shown in FIG. 2 further has a water refill tube 75. The water refill tube 75 connects the inner cavity 61 of the water refill tank 60 with the suction pressure chamber 71. The water refill tube 75 is preferably connected to the top or near the top of the suction pressure chamber 71. The water refill tube 75 preferably feeds the water stored in the water refill tank 60 into an upper space of the suction pressure tank 70. The filter material 25 is interposed between the inner cavity 24 of the cultivation tank 19 and the suction pressure chamber 71. The suction pressure tank 70 replenishes water to the cultivation tank 19 via the filter material 25.

The water replenishing device 59 shown in FIG. 2 further has an adjuster 78. The adjuster 78 is provided to the water refill tube 75. The cross-sectional area of the water flow path inside the adjuster 78 can be changed freely by operating the adjuster 78. The adjuster 78 therefore can adjust the flow rate of the cultivation water inside the water refill tube 75. The adjuster 78 may be a valve, or a cock. By adjusting the flow rate of the cultivation water, the water level in the cultivation tank 19 can be made optimal in accordance with the types of the plants or external environment.

The water refill tube 75 may have flexibility in the portion where the adjuster 78 is provided. The water refill tube 75 may be made of elastomer. In this case, the adjuster 78 may be a clamp. A roller clamp is preferable. A roller clamp can change the cross-sectional area of the inner cavity of the water refill tube 75 to a given size by compressing the water refill tube 75. The roller clamp, as the adjuster 78, therefore can adjust the flow rate of the cultivation water inside the water refill tube 75.

The water replenishing device 59 shown in FIG. 2 may not include the adjuster 78. In this case, the inner cavity of the water refill tube 75 need to have an appropriate cross-sectional area. For example, the cross-sectional area of the inner cavity of the water refill tube 75 may be set smaller than the cross-sectional area of the inner cavity of the watering channel 38.

The suction pressure tank 70 shown in FIG. 2 is separate from the cultivation tank 19. Therefore, the device 100 may further include a water supply pipe 77. The water supply pipe 77 connects the bottom section 20 of the cultivation tank 19 with the suction pressure chamber 71. The suction pressure tank 70 and the cultivation tank 19 may be integral with each other as will be shown in the examples below.

Example 2

Figure 4:
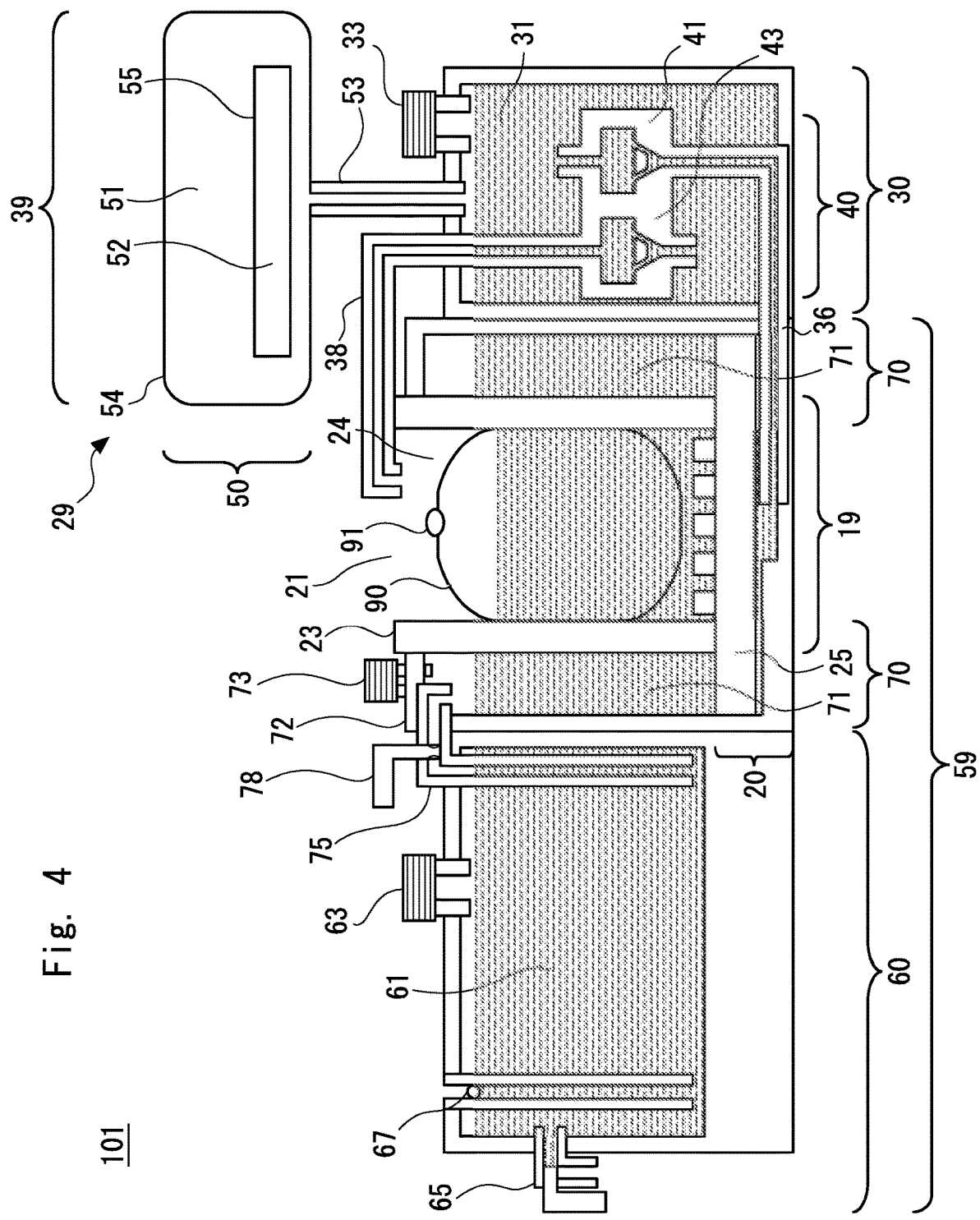
FIG. 4 is a schematic diagram of a plant cultivation device according to Example 2.

FIG. 4 is a schematic diagram of a device 101, which is a plant cultivation device according to Example 2. In the device 101, the cultivation tank 19 is located inside the suction pressure tank 70. The body part 23 of the cultivation tank 19 constitutes part of the walls of the suction pressure chamber 71. In other words, the suction pressure tank 70 and cultivation tank 19 are integrated, sharing the walls. The suction pressure chamber 71 may laterally surround the cultivation tank 19.

The filter material 25 shown in FIG. 4 extends to the bottom section of the suction pressure chamber 71. In this example, therefore, the water supply pipe 77 shown in FIG. 1 has been removed. In other words, the water replenishing device 59 is connected to the cultivation tank 19 via the filter material 25. The suction pressure tank 70 has an outer shell 72. The space surrounded by the outer shell 72, body part 23, and filter material 25 forms the suction pressure chamber 71.

In the device 101 shown in FIG. 4, the pair of check valves 40 is arranged inside the water tank 30. Therefore, the water inlet pipes 35 and 37 shown in FIG. 1 may be omitted. In the device 101, the cultivation tank 19, water tank 30, suction pressure tank 70, and water refill tank 60 are integrated. The air tank 50 only is separate from these. The air tank 50 is preferably provided outside the device 101 because of the need to receive the sunlight.

Figure 5:
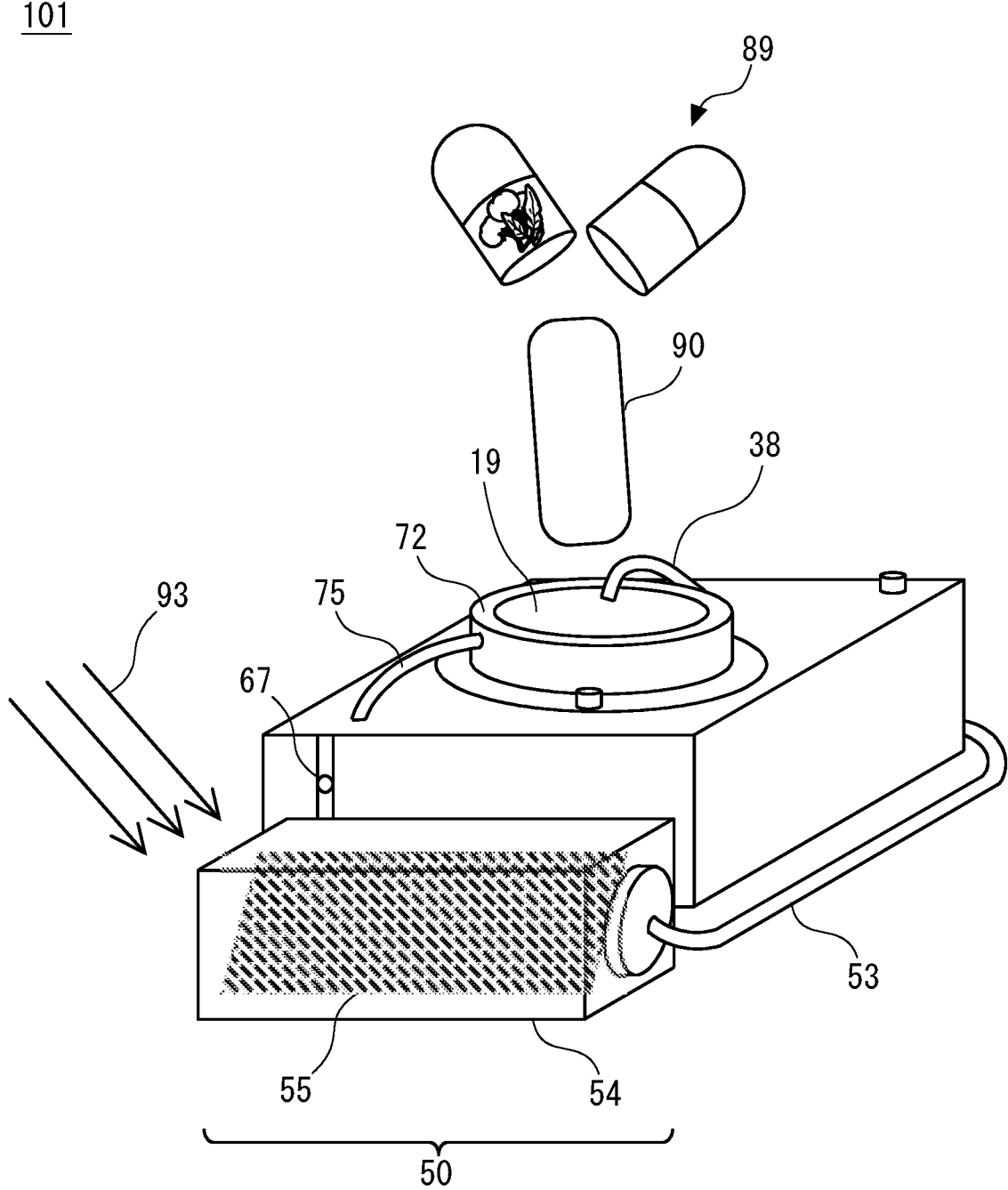
FIG. 5 is a perspective view of the plant cultivation device according to Example 2.

FIG. 5 is a perspective view of the device 101. Some components are omitted. The components other than the air tank 50 are integrated such as to surround the cultivation tank 19. The device 101 can easily be designed to have a smaller volume than that of the device 100 shown in FIG. 1. The plant cultivation device can therefore be transported and installed as a unit.

Since the pump chamber 39 shown in FIG. 4 includes an air feed pipe 53, the air tank 50 can be separated from the water tank 30. Therefore, as shown in FIG. 5, the air tank 50 can readily be installed at a position where the sunlight 93 can be easily received. The air tank 50 may be distanced from other components on a plane, for example. The air feed pipe 53 may be curved at 90 degrees or more as shown in FIG. 5. The air feed pipe 53 may have sufficient flexibility so that such bending is possible.

A method of cultivating plants with the use of the device 101 shown in FIGS. 4 and 5 will be shown below. First, as shown in FIG. 4, the water tank 30 and cultivation tank 19 are filled with water. The portions with fine horizontal hatching in the drawing represent the presence of water. This applies also to other drawings. The sealing plug 33 is opened when water is poured into the water tank 30. Water is poured into the inner cavity 31 through the open sealing plug 33. After that, the sealing plug 33 is shut to make the pump chamber 39 airtight.

The culture medium material 90 shown in FIG. 4 is preferably a material 90 that contains a water-absorbent compressed material as shown in FIG. 5 before use. The water-absorbent compressed material may be a dried natural material. The water-absorbent compressed material preferably expands when immersed in water by absorbing the water.

The properties of the water-absorbent compressed material are not specifically limited. The properties are preferably selected from the viewpoints of water retainability, air and water permeabilities, and high swelling efficiency. From these viewpoints, fibrous substances can be named as one example. Fibrous substances include plant fibers, and mineral fibers such as rock wool. Alternatively, the water-absorbent compressed material may be made of a vegetable fertilizer. Vegetable fertilizers are advantageous in that nitrogen deficiency can hardly occur in the culture medium material 90 as compared to immature plant fibers, for example. This is because the fibrous substances have been well decomposed in vegetable fertilizers.

The culture medium material 90 shown in FIG. 5 has been dried, so that it is lightweight and can be easily stored. The culture medium material 90 is compressed, too, so that it can be readily transported. Preferably, therefore, the culture medium material 90 is produced beforehand, with compositions suitable for the plant cultivation method according to this example, stored, transported to a cultivation site, and unpackaged at the cultivation site as required.

The culture medium material 90 before use is preferably packed in a capsule 89 as shown in FIG. 5. The capsule 89 functions as a package material of the culture medium material 90. Packaging in capsules 89 promotes embodiment of this method even in areas where suitable water-absorbent compressed materials are not available.

The culture medium material 90 is taken out of the capsule 89 as shown in FIG. 5. The culture medium material 90 has been compressed and has its volume reduced. Therefore, this culture medium material 90 can be easily inserted into the inner cavity of the cultivation tank 19 from the upper face opening of the cultivation tank 19. Since the culture medium material 90 is a water-absorbent compressed material, its volume increases when immersed in water as shown in FIG. 4. For cultivation of plants, the culture medium material is let swell until the culture medium material 90 abuts on the inner wall surface of the cultivation tank 19.

Referring back to FIG. 4, seeds 91 of a desired type of plant are sown on the upper face of the culture medium material 90 shown in FIG. 4. One or more types of seeds 91 can be sown on the culture medium material 90. The seeds 91 may be covered with a culture medium material of the same composition as that of the culture medium material 90, soil, or other culture medium materials. The plants are thus cultivated on the upper face of the culture medium material 90.

Instead of the seeds 91 shown in FIG. 4, young plants, seedlings, cuttings, bulbs, or other plant tissues of desired types of plants may be planted. The plant may be a vegetable, or a fruit. The vegetable can be any of root vegetables, leaf vegetables, stem vegetables, flower vegetables, and fruit vegetables. Fruit vegetables include tomatoes, cucumbers, and eggplants, but are not limited to these.

Sunlight 93 is directed to the heat-collecting surface 52 shown in FIG. 5. This can be done by setting the air tank 50 or the device 101 under the sunlight 93. The heat-collecting surface 52 receives the solar heat as mentioned above. During the day, the heat-collecting surface 52 receives the sunlight 93 and collects heat. During the night, the heat-collecting surface 52 does not receive the sunlight 93, so it does not collect heat. Heat collection by the heat-collecting surface 52 thus fluctuates in daily cycles. While affected by the latitude and weather conditions, the collected heat fluctuations in daily cycles go on without requiring man-made power.

Figure 6:
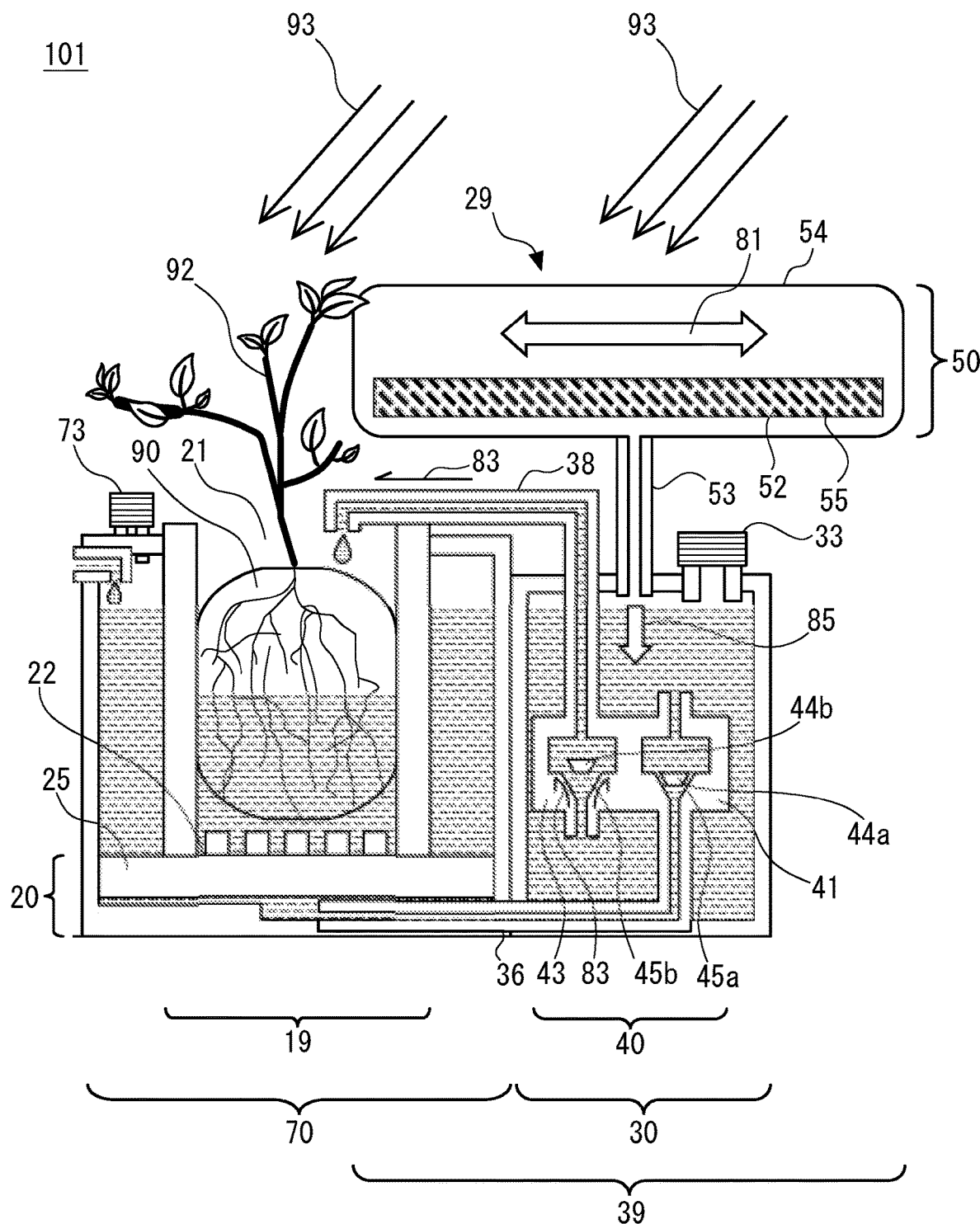
FIG. 6 is a schematic diagram of a discharge operation of a pump according to Example 2.

FIG. 6 is a schematic diagram of a discharge operation of the pump 29. In the drawing, the water refill tank, which is part of the water replenishing device, is omitted. The drawing shows the device 101 during the day. When the sunlight 93 reaches the heat-collecting surface 52 during the day, the heat-collecting surface 52 receives the solar heat.

The heat-collecting body 55 shown in FIG. 6 gives away the thermal energy received by the heat-collecting surface 52 to the surrounding air. The thermal energy raises the temperature, as well as pressure, of the air inside the inner cavity 51. The container 54 at this time does not undergo a significant deformation because of a difference in pressure between inside and outside of the container 54. Therefore, pressure rise 81 from the level before the reception of the sunlight 93 occurs inside the air tank 50.

As shown in FIG. 6, the water tank 30 is filled with water. The pressure rise 81 travels through the air feed pipe 53 to the water tank 30. Pressure 85 acts to press down the water surface inside the water tank 30. In other words, the pressure of the water whose surface has been pressed by the air tank 50 inside the water tank 30 exceeds the pressure of the water inside the watering channel 38.

Accordingly, when the pressure 85 shown in FIG. 6 acts on the water, the valve member 44b is pushed up. This cancels the tight contact between the valve member 44b and the valve seat 45b. The valve member 44b and the valve seat 45b separate further from each other. Then, an upward water flow 83 is created in the discharge check valve 43. In other words, the watering channel 38 is opened.

On the other hand, water tries to flow downward in the suction check valve 41 shown in FIG. 6. However, since the valve member 44a is in tight contact with the valve seat 45a, the water is stopped. In other words, the water-sucking pipe 36 is shut. Therefore, the water flow 83 is predominantly generated and the pump 29 can carry out the desired discharge operation. In other words, the water inside the water tank 30 is fed to the cultivation tank 19 through the watering channel 38. No water flow is created in the water-sucking pipe 36.

When the valve member 44b shown in FIG. 6 is pushed up, the water flow 83 reaches the watering channel 38. The water inside the water tank 30 eventually flows out from the distal end of the watering channel 38 and drops onto the upper face opening 21 of the cultivation tank 19. The water falls through and onto the upper face of the culture medium material 90. As the water contacts the air, oxygen is dissolved in the water.

The seedling 92 shown in FIG. 6 has been germinated from the seed 91 shown in FIG. 4 and grown. The water inside the water tank 30 is irrigated to the culture medium material 90 through the watering channel 38. The roots of the seedling 92 absorb the water from the culture medium material. Thus the seedling 92 can actively transpire as it receives the sunlight 93 during the day.

As described above, the device 101 shown in FIG. 6 can speed up the growth of the seedling 92. The device 101 can provide this function without receiving power supply or electronic control.

As the water flow 83 shown in FIG. 6 is created, the water in the water tank 30 is decreased. This increases the air volume in the air tank 50 and in the water tank 30. The increase in air volume reduces the pressure rise 81, so that the pressure 85 is decreased.

When the pressure 85 shown in FIG. 6 is reduced, the pressure 85 soon comes to counterbalance the atmospheric pressure, pump head pressure, and pressure losses in the discharge check valve 43 and in the watering channel 38. When this happens and the water flow 83 stops, the valve member 44b goes down by gravity and makes surface contact with the valve seat 45b. Thus generation of a water flow in the opposite direction from the water flow 83 is prevented.

Figure 7:
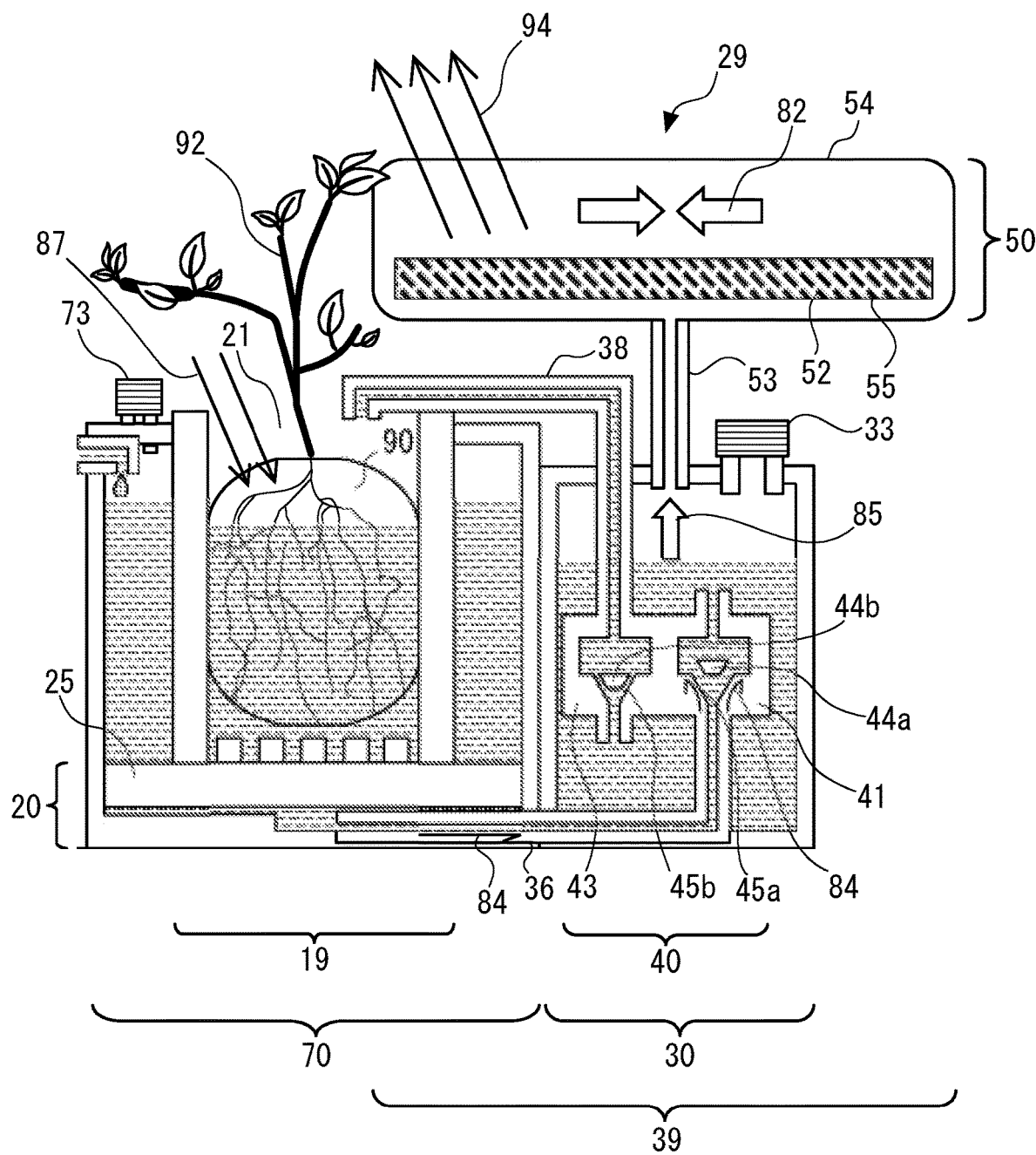
FIG. 7 is a schematic diagram of a suction operation of the pump according to Example 2.

FIG. 7 is a schematic diagram of a suction operation of the pump 29. In the drawing, the water refill tank, which is part of the water replenishing device, is omitted. The drawing shows the device 101 during the night. The heat-collecting surface 52 does not receive solar heat during the night. When the temperature of the atmosphere is lower than that of the heat-collecting surface 52, radiation heat 94 is released to the atmosphere.

The heat-collecting body 55 that has released heat from the heat-collecting surface 52 shown in FIG. 7 is cooled down. The heat-collecting body 55 takes in thermal energy from the air in the inner cavity 51. The temperature of the air in the inner cavity 51 drops, and so does the pressure. Therefore, pressure reduction 82 from the level before the reception of the sunlight 93 occurs inside the air tank 50.

As shown in FIG. 7, the water tank 30 is filled with water. The pressure reduction 82 travels through the air feed pipe 53 to the water tank 30. Pressure 86 acts to raise the water level inside the water tank 30. In other words, the pressure of the water whose surface has been raised by the air tank 50 inside the water tank 30 falls below the pressure of the cultivation water inside the water-sucking pipe 36.

Accordingly, when the pressure 86 shown in FIG. 7 acts on the water, the valve member 44a is pushed up. This cancels the tight contact between the valve member 44a and the valve seat 45a. The valve member 44a and the valve seat 45b separate further from each other. This creates an upward water flow 84 in the suction check valve 41. In other words, the water-sucking pipe 36 is opened.

On the other hand, water tries to flow downward in the discharge check valve 43 shown in FIG. 7. However, since the valve member 44b is in tight contact with the valve seat 45b, the water is stopped. In other words, the watering channel 38 is shut. Therefore, the water flow 84 is predominantly generated and the pump 29 can carry out the desired suction operation. In other words, the water inside the cultivation tank 19 is fed through the water-sucking pipe 36 in accordance with the rising of the water inside the water tank 30. No water flow is created in the watering channel 38.

When the valve member 44a shown in FIG. 7 is pushed up, the water flow 84 connects to the water-sucking pipe 36. Water is drawn from the culture medium material 90 through the bottom section 20 into the water-sucking pipe 36. The water inside the culture medium material 90 moves toward the bottom section 20 by gravity or capillary action. Since no water flow is created in the watering channel 38 during the night as described above, no water is supplied from the water tank 30 to the cultivation tank 19.

As shown in FIG. 7, fresh air 87 is supplied through the upper face opening 21 into the culture medium material 90, from which the water has been sucked away as described above. This brings about aerobic conditions in the culture medium material 90 and promotes bacterial nitrification in the culture medium material 90. The water passes through the filter material 25 positioned in the bottom section 20. The filter material 25 filters wastes from the water and purifies the water. The filter material 25 may also exchange ions with the water.

As described above, the device 101 shown in FIG. 7 can improve the soil environment in the culture medium material 90. The device 101 can provide this function without receiving power supply or electronic control.

As the water flow 84 shown in FIG. 7 is created, the water in the water tank 30 is increased. The volume of the air inside the pump chamber 39 is therefore decreased. The increase in air volume reduces the pressure reduction 82, so that the pressure 86 is decreased.

When the pressure 86 shown in FIG. 7 is reduced, the pressure 86 soon comes to counterbalance the atmospheric pressure, pump head pressure, and pressure losses in the suction check valve 41 and in the water-sucking pipe 36. When this happens and the water flow 84 stops, the valve member 44a goes down by gravity and makes surface contact with the valve seat 45a. Thus generation of a water flow in the opposite direction from the water flow 84 is prevented.

As shown in FIGS. 6 and 7, the pump 29 repeatedly supplies water from the water tank 30 to the cultivation tank 19 and receives water from the cultivation tank 19 to the water tank 30 in cycles. The device 101 thus functions as a water-circulating plant cultivation device. This cyclic supplying and receiving of water relies on the daily cycles of fluctuations in the heat collected by the heat-collecting surface 52. Thus the device 101 can provide this water-circulating function without receiving power supply or electronic control.

The pump 29 shown in FIG. 7 may carry out the suction operation not only during the night but also when the sun is blocked by clouds. The seedling 92 transpires less actively when the sun is blocked by clouds. Therefore, the culture medium material 90 can have a lower water content than when there is sunlight. The device 101 is therefore suited to controlling the water content of the culture medium material 90 in accordance with the amount of sunlight.

Figure 8:
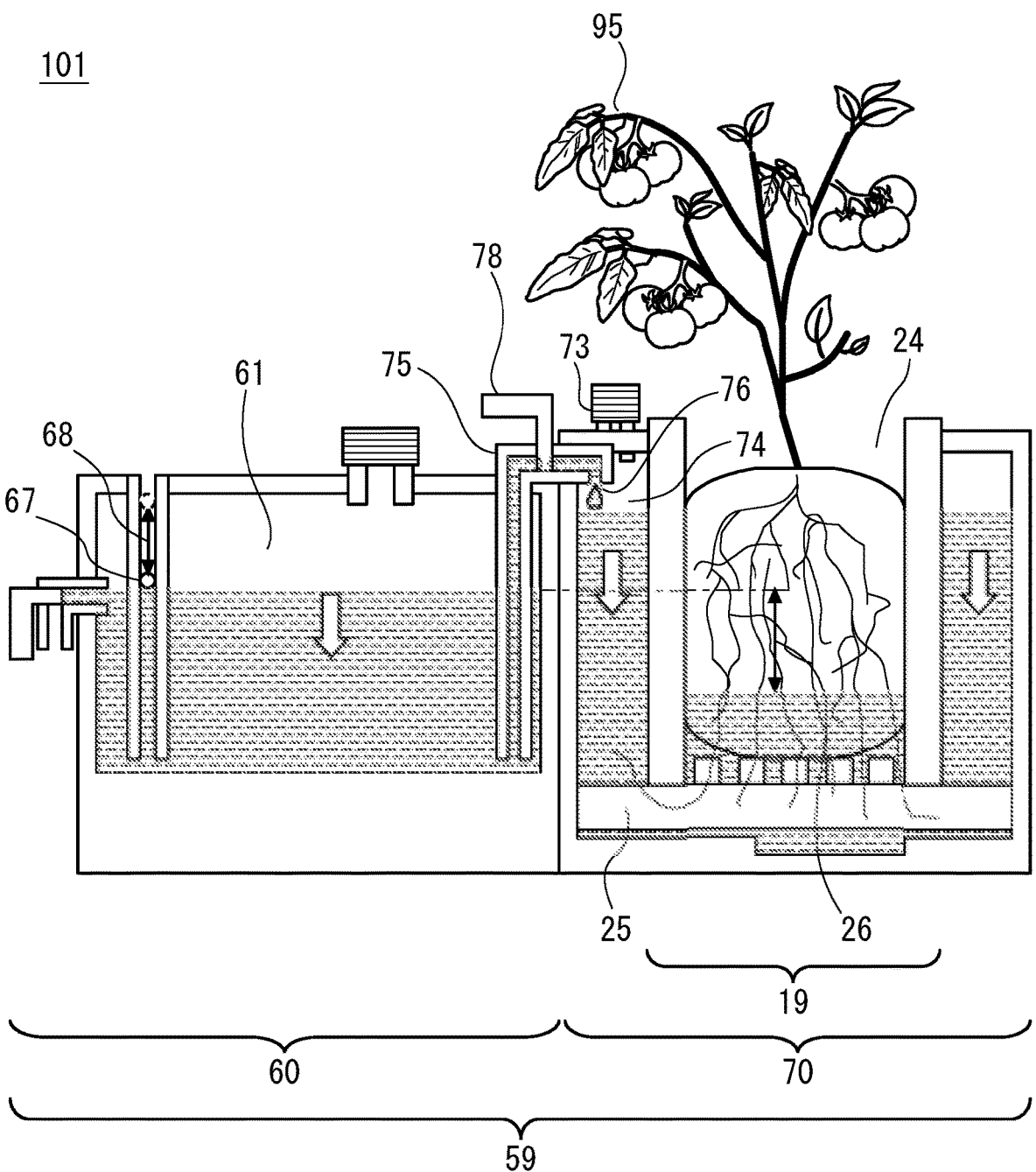
FIG. 8 is a schematic diagram of an operation of a water replenishing device according to Example 2.

Next, the water supply operation of the water replenishing device 59 will be described with reference to FIG. 8. In FIG. 8, the pump and components connected thereto are omitted.

First, the significance of the water replenishing device 59 shown in FIG. 8 will be explained. As has been shown in FIG. 6, the seedling 92 absorbs the water in the culture medium material 90 and releases the water content to the atmosphere by transpiration. Thus the water is lost from the circulation system consisting of the cultivation tank 19 and the pump 29 shown in FIGS. 6 and 7.

When the seed 91 is sown, the water refill tank 60 is filled with water, as shown in FIG. 4. The suction pressure chamber 71 is airtightly sealed. The water replenishing device 59 keeps replenishing the water in the water refill tank 60 to the circulation system mentioned above. The water replenishing period is longer than one daily cycle of supplying and receiving water by the pump 29.

The young plant 95 shown in FIG. 8 has grown from the seedling 92 shown in FIG. 6. Preferably, the water replenishing device 59 keeps replenishing water to the circulation system until the seed 91 shown in FIG. 4 grows into the young plant 95 shown in FIG. 8, and until the young plant 95 bears fruit ready for harvest. This period shall be referred to as cultivation period. Water consumption during the cultivation period appears as a water level drop 68.

The water level in the inner cavity 61 of the water refill tank 60 shown in FIG. 8 is higher than the water level in the inner cavity 24 of the cultivation tank 19. This water level difference 26 causes the water in the water refill tank 60 to flow toward the cultivation tank 19. This indicates that there is a certain level of water pressure, or a water pressure difference. This water pressure or water pressure difference shall be referred to as "pressure loss". The pressure loss between the water refill tank 60 and the cultivation tank 19 propagates indirectly through the suction pressure chamber 71.

The suction pressure chamber 71 shown in FIG. 8 is airtightly sealed as mentioned above. As the suction pressure tank 70 replenishes water to the cultivation tank 19, the water level of the suction pressure chamber 71 goes down. When the water level of the suction pressure chamber 71 lowers, the volume of the air 74 expands. The pressure of the air 74 is thus reduced.

When the pressure of the air 74 shown in FIG. 8 is reduced, suction pressure is applied to the opening 76 of the water refill tube 75 that faces the suction pressure chamber 71. Thus the water inside the water refill tube 75 progresses into the suction pressure chamber 71 from the opening 76. In other words, the water inside the water refill tank 60 is fed into the upper space of the suction pressure tank 70. This water drops down onto the water surface in the suction pressure chamber 71. This way, the water level that has lowered recovers. The volume of the air 74 returns to its original level. Thus the pressure of the air 74 recovers.

When the water inside the water refill tube 75 shown in FIG. 8 moves into the suction pressure chamber 71 from the opening 76, the volume of the air 74 reduces. The pressure of the air 74 thus rises. Thus water pressure is applied to the filter material 25 that faces the suction pressure chamber 71. There is created a water pressure difference in the filter material 25 between the suction pressure chamber 71 side and the cultivation tank 19 side. Due to the pressure loss in the filter material 25, not all the pressure difference propagates to the cultivation tank 19. Therefore, the water flows from the suction pressure chamber 71 toward the cultivation tank 19 more slowly than when there is no filter material 25.

The operation of the suction pressure chamber 71 shown in FIG. 8 is performed continuously or intermittently without requiring human control. Namely, the water moves continuously or intermittently from the water refill tank 60 toward the cultivation tank 19 by the effects of the pressure loss described above. Water is replenished from the water refill tank 60 toward the cultivation tank 19 in a timely manner to make up for the amount lost by transpiration from the young plant 95 or desiccation from the upper face of the culture medium material 90.

The flow rate of the water traveling from the water refill tank 60 toward the cultivation tank 19 shown in FIG. 8 can be adjusted by the adjuster 78. As shown in FIG. 7, water is drawn from the culture medium material 90 through the bottom section 20 into the water-sucking pipe 36. If the flow rate of the water traveling from the water refill tank 60 toward the cultivation tank 19 is excessive, the culture medium material 90 keeps replenished with water, so that the water cannot be sucked away from the culture medium material 90.

Meanwhile, as shown in FIG. 6, water is supplied from the watering channel 38 irrespective of the water content of the culture medium material 90. Therefore, there may be cases where the total amount of water supplied to the culture medium material 90 shown in FIG. 8 is excessive. This is where the adjuster 78 helps control the total amount of water supplied to the culture medium material 90.

As shown in FIGS. 6 and 7, the water level in the cultivation tank 19 varies in daily cycles. Therefore, the pressure loss varies in daily cycles. The water level difference 26 may be considered as a difference between an average water level per day in the cultivation tank 19 and the water level of the water refill tank 60. The pressure loss remains constant throughout the cultivation period.

For example, when a water level drop 68 is observed in the water refill tank 60 shown in FIG. 8, the average water level in the cultivation tank 19 is also reduced. As the average water level in the cultivation tank 19 decreases, the roots of the young plant 95 grow deep down into the culture medium material 90. The roots may reach the filter material 25. The roots may even extend through the filter material 25. With the roots extended long into the culture medium material 90, the young plant 95 can better absorb nutrients.

In the water replenishing device 59 shown in FIG. 8, backflow of the water can hardly ever happen. This is because the air 74 that has a certain volume separates the opening 76 and the water surface of the suction pressure chamber 71. That the opening 76 is smaller than the water surface of the suction pressure chamber 71 also contributes to this. Namely, it is attributed to the fact that, based on Pascal's law, the force required for pressing the water in the water refill tube 75 from the suction pressure chamber 71 side to flow reversely is much larger than the force required for pressing down the water surface of the suction pressure chamber 71.

The plant cultivation method according to the example has been described above with reference to FIGS. 4 to 8. This method provides the following advantages in cultivating plants. The following advantages can also be enjoyed with the use of devices according to other embodiments or examples.

First, the method according to the example enables the use of organic fertilizers. This is an advantage not available in common hydroponics. Organic fertilizer contains a large amount of microorganisms including harmful bacteria and is difficult to use in hydroponics. In the method according to the example, the air is introduced periodically into the culture medium material so that the micro-organic balance in the culture medium material can be kept in conditions suited to the growth of plants.

Soil may contain plant pathogens or pests, but the plants grown by the method according to the example will be less affected by them, because the cultivation tank is separated from the ground. This is an advantage over soil cultivation.

With the method according to the example, the cost will not be too high even if it is performed for a single plant. This is because, according to the example, growing of plants by watering during the day, improvement of the soil environment, and continuous replenishment of water over a cultivation period can be realized without using electronic control.

While it is possible to cultivate a single plant in common hydroponics, too, it is not practical from the viewpoint of industrial applicability. In common hydroponics, costs are incurred for electronic control and reduction of harmful bacteria. It is essential in actuality to reduce the proportion of these costs to the overall cost of cultivation. No feasible methods have been found out other than increasing the scale of cultivation to realize such a cost reduction.

Figure 9:
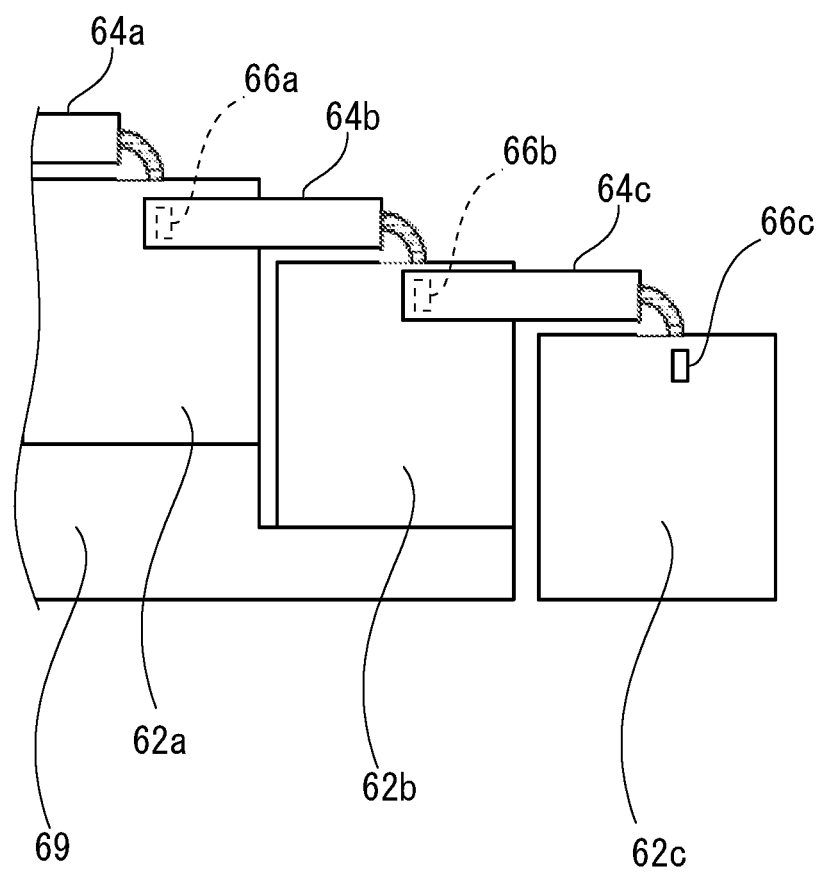
FIG. 9 is a side view of a water refill tank according to a variation of Example 2.

FIG. 9 is a side view of water refill tanks 62a to 62c according to a variation example of the device. The structure of the water refill tanks 62a to 62c is the same as that of the above-described water refill tank 60 except for the points noted below. In this variation, the plant cultivation device includes two or more pairs of cultivation tank and water replenishing device.

Each pair includes the water refill tanks 62a to 62c. The water refill tanks 62a to 62c shown in FIG. 9 are disposed on a step-like base 69. The water refill tanks 62a to 62c are arranged sequentially from the top. The plurality of water refill tanks 62a to 62c are arranged stepwise. The water refill tanks should preferably be arranged such that there is a water level difference between one water refill tank and another water refill tank.

The device shown in FIG. 9 includes one water supply passage, or two or more water supply passages, instead of the discharge pipe 65 mentioned above. In this variation, the device includes water supply passages 64a to 64c. The water supply passages 64b and 64c connect to the side faces of the water refill tanks 62a and 62b, respectively.

The water supply passages 64a to 64c shown in FIG. 9 each extend from a side face of the water refill tank included in one pair to above the upper face opening of the water refill tank included in another pair. Namely, the water supply passages 64b and 64c respectively extend from the side faces of the water refill tanks 62a and 62b to above the upper face openings of the water refill tanks 62b and 62c. Discharge ports 66a to 66c are provided to the side faces of the water refill tanks 62a to 62c. The water supply passages 64b and 64c may respectively connect to the discharge ports 66a and 66b.

In this variation example, the water supply passages 64a to 64c are provided as water supply means to upper-side water refill tanks. These water supply passages 64a to 64c supply the water in the upper-side water refill tank(s) to lower-side water refill tank(s). In this variation example, water can be refilled to all the water refill tanks by supplying water to the uppermost water refill tank.

Figure 10:
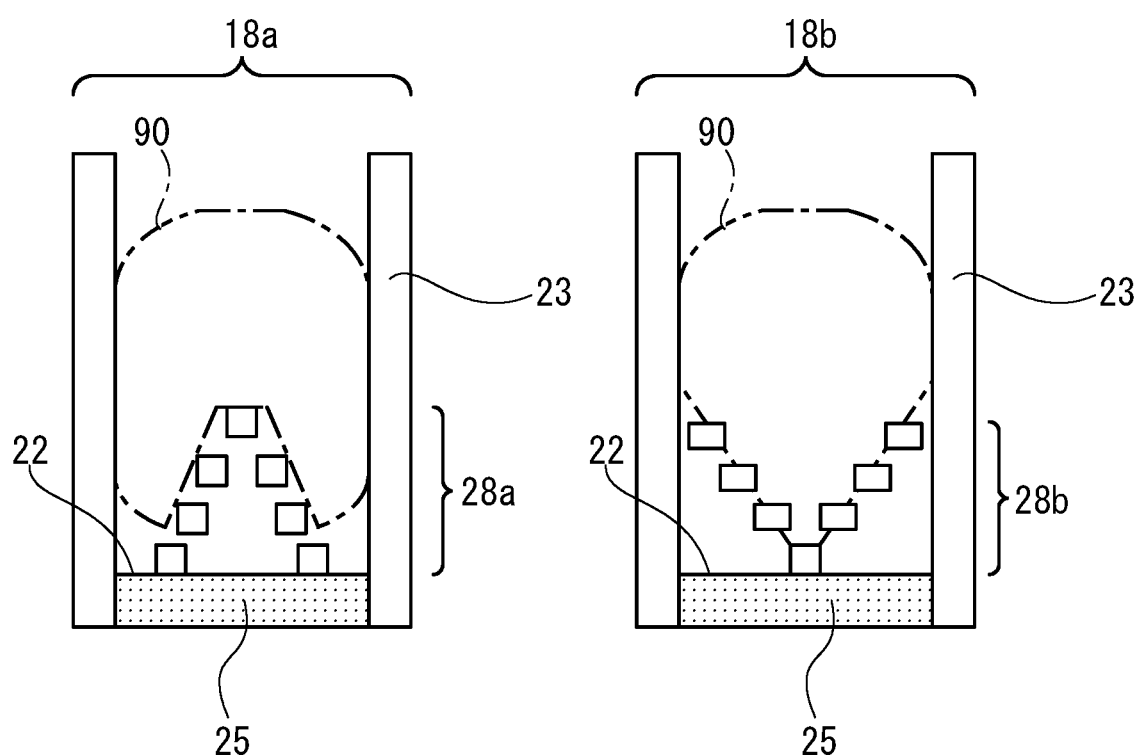
FIG. 10 is a schematic diagram of a culture medium material supporter according to a variation of Example 2.

FIG. 10 is a schematic diagram of cultivation tanks 18a and 18b according to a variation example of the device. The structure of the cultivation tanks 18a and 18b is the same as that of the above-described cultivation tank 19 except for the points noted below. The cultivation tanks 18a and 18b include supporters 28a and 28b, respectively. The supporter 28a has a downwardly tapered, funnel-like shape, and the supporter 28a has a downwardly tapered, funnel-like shape.

In the cultivation tank 19 shown in FIG. 3, the space between the culture medium material 90 and the upper face 22 of the filter material 25 is small. When irrigated, therefore, the cultivation tank 19 is soon fully filled with water. On the other hand, the supporters 28a and 28b shown in FIG. 10, by their funnel-like shape, can form some space between the filter material 25 and the bottom part of the culture medium material 90.

In the cultivation tanks 18a and 18b shown in FIG. 10, the space between the culture medium material 90 and the upper face 22 of the filter material 25 is larger than that of the cultivation tank 19 shown in FIG. 3. Therefore, the cultivation tanks 18a and 18b are not fully filled with water soon when irrigated. Namely, the shape of the supporters 28a and 28b functions to buffer the rise of the water level.

The culture medium material 90 before being immersed in water may have a lower face that is upwardly tapered funnel-like shape, so that it can be fitted with the supporter 28a shown in FIG. 10. Or, the culture medium material 90 before being immersed in water may have a lower face that is downwardly tapered conical shape, so that it can be fitted with the supporter 28b.

Figure 11:
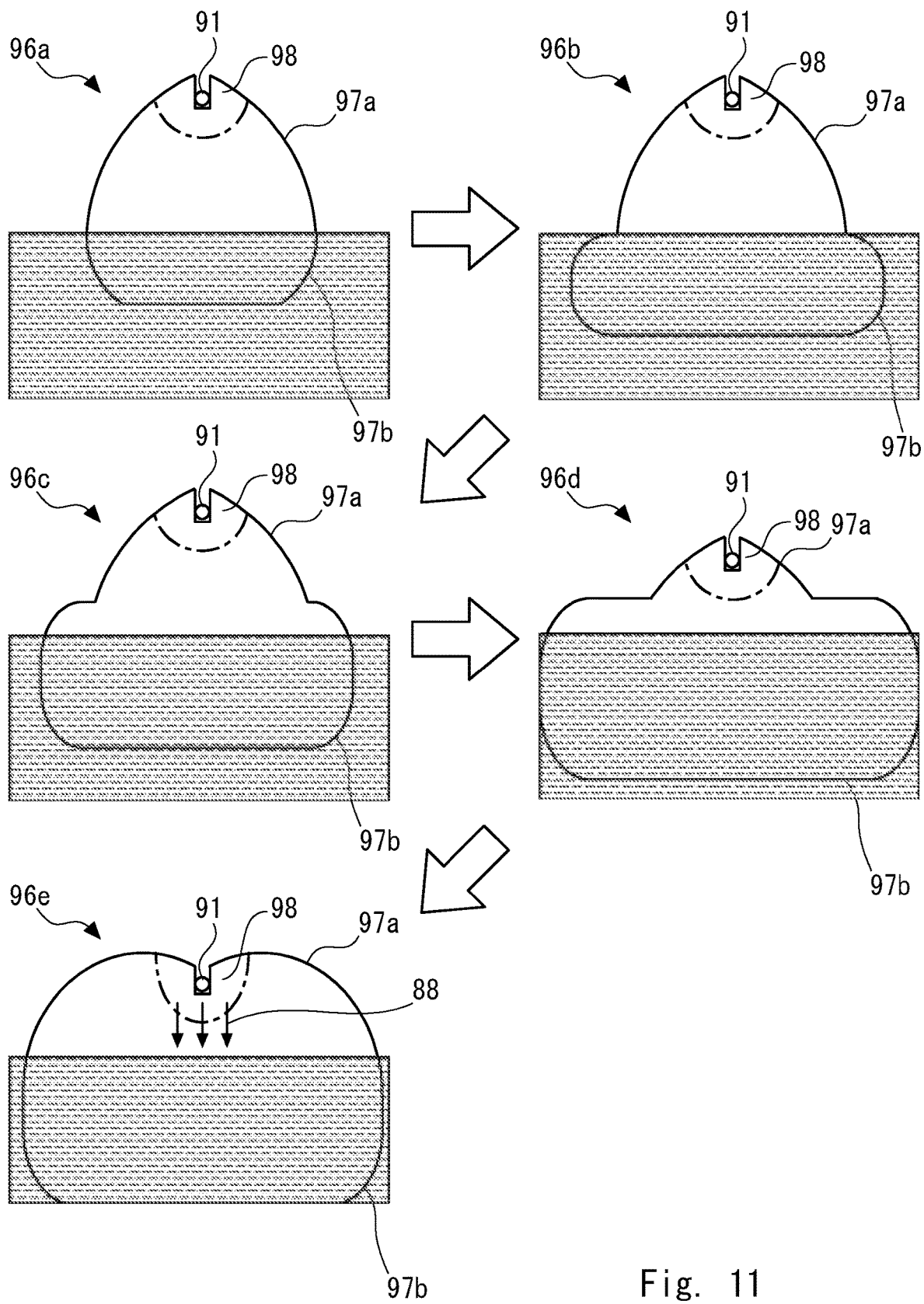
FIG. 11 is a schematic diagram of an expansion process of the culture medium material according to a variation of Example 2.

FIG. 11 is a schematic diagram of an expansion process of the culture medium material according to a variation example of the method. The culture medium material 96a that is a water-absorbent compressed material is immersed in water, to obtain the culture medium material 96e, after going through various forms of cultural medium materials 96b to 96d in accordance with the predetermined expansion process.

The culture medium material 96a shown in FIG. 11 has an upper part 97a and a lower part 97b. The lower part 97b has a flat bottom face. The upper part 97a has an upwardly tapered conical shape. Therefore, the culture medium material 96a floating on water has restorability. Namely, the tip of the upper part 97a with a conical shape, of the culture medium material 96a, appears above the water surface.

The culture medium material 96a shown in FIG. 11 has a seed receiving part 98. The tip of the upper part 97a is formed as the seed receiving part 98. The material of the seed receiving part 98 has higher water retainability than the material of the main body of the culture medium material 96a. Therefore, it is well suited to germination of seeds or watering for seedlings.

The material of the seed receiving part 98 shown in FIG. 11 preferably has a larger particle size than the material of the main body of the culture medium material 96a. The seed receiving part 98 preferably contains more clay substances than the main body of the culture medium material 96a. This way, the seed receiving part 98 has suitable water retainability.

The seed 91 of a plant is embedded in the seed receiving part 98 shown in FIG. 11. Therefore, the seed 91 will hardly go under the water. The culture medium materials 96a to 96e are hard to tip over. The seed 91 will unlikely come to position under the culture medium material 96e.

The culture medium material 96a shown in FIG. 11 has a conical shape. Therefore, even after the culture medium material 96a has expanded to become the culture medium material 96e, the seed receiving part 98 is still positioned on the ridge or hill of the culture medium material. Thus discharge 88 of water from the seed receiving part 98 can be efficiently performed during the cultivation of the plant.

Example 3

Figure 12:
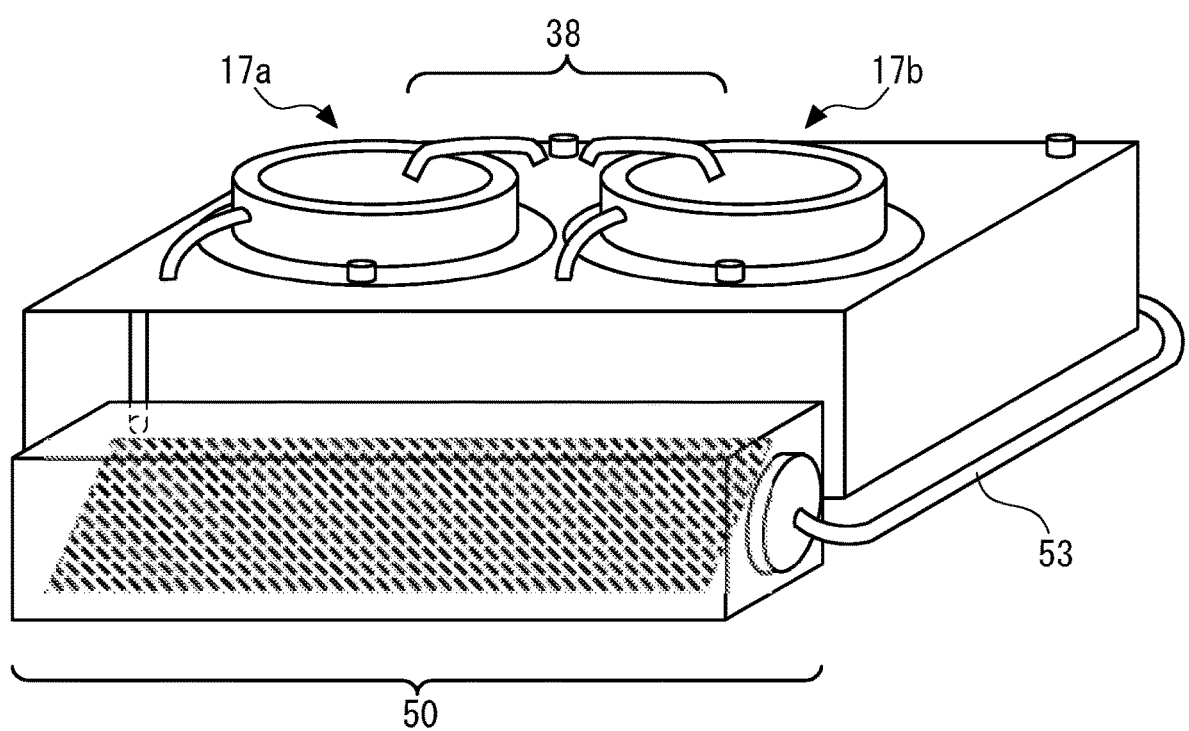
FIG. 12 is a perspective view of a device of a double tank type according to Example 3.

FIG. 12 is a perspective view of a device 102 of a double tank type according to Example 3. Below, the differences between the device 102 and the device 101 shown in FIG. 5 will be mainly described. The device includes two cultivation tanks 17a and 17b. The watering channel 38 extends as far as to the upper face openings of the cultivation tanks 17a and 17b.

The device 102 shown in FIG. 12 has one pump. This pump includes one air tank 50. The pump of the device 102 has one or two water tanks. The water tank(s) connect(s) to the one air tank 50. The device 102 has better space efficiency than the device 101.

Example 4

Figure 13:
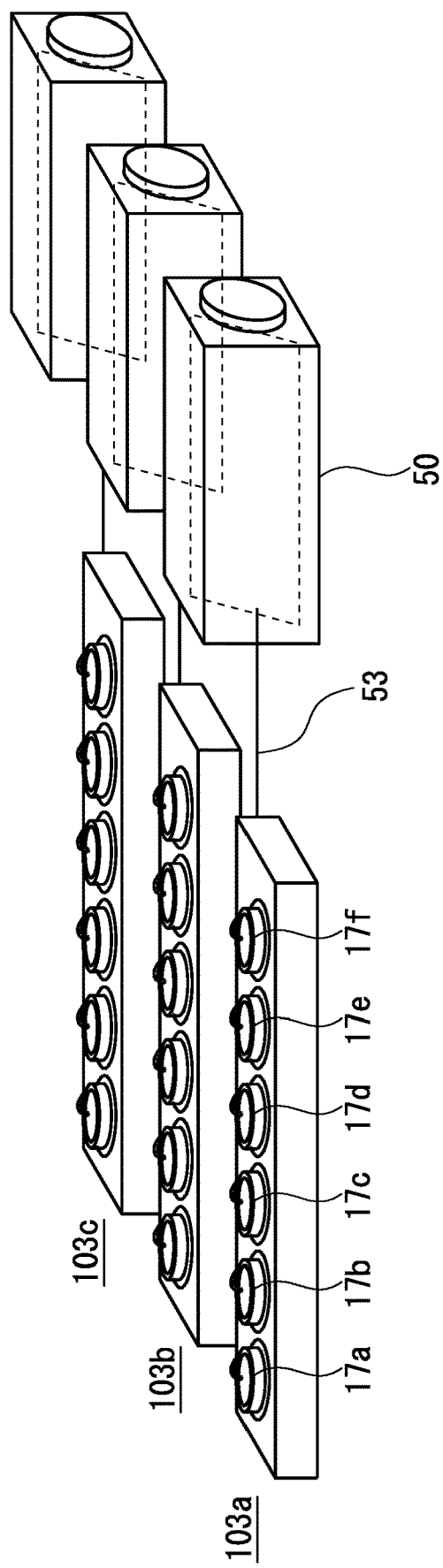
FIG. 13 is a perspective view of a device of a multiple tank type according to Example 4.

FIG. 13 is a perspective view of devices 103a to 103c of a multiple tank type according to Example. Below, the differences between the devices 103a to 103c and the device 101 shown in FIG. 5, and the device 102 shown in FIG. 9 will be mainly described. The device 103a includes three or more cultivation tanks.

For example, the device 103a shown in FIG. 13 includes cultivation tanks 17a to 17f. The device 103a has one pump. This pump includes one air tank 50. The pump of the device 103 has one water tank, or two or more water tanks. The water tank(s) connect(s) to the one air tank 50. The devices 103b and 103c have the same structure as that of the device 103a.

Devices equivalent to the devices 103a to 103c shown in FIG. 13 can be arranged in as large a number as the available land area permits. Water, on the other hand, need not be supplied every day to the entire surface of the land for cultivating the plants. The plants can be grown well only by filling the water refill tanks of the devices 103a to 103c and other devices just once. Water may be replenished to the water refill tanks as required.

Growing plants with the use of the devices 103a to 103c shown in FIG. 13 requires less water than growing plants planted directly on the land. This is because the water in the devices 103a to 103c hardly seeps into the land as ground water. This also indicates that soil pollution by pesticides can hardly occur even if pesticides are added to the water circulated in the devices 103a to 103c. This also applies when other devices mentioned above are used.

Example 5

Figure 14:
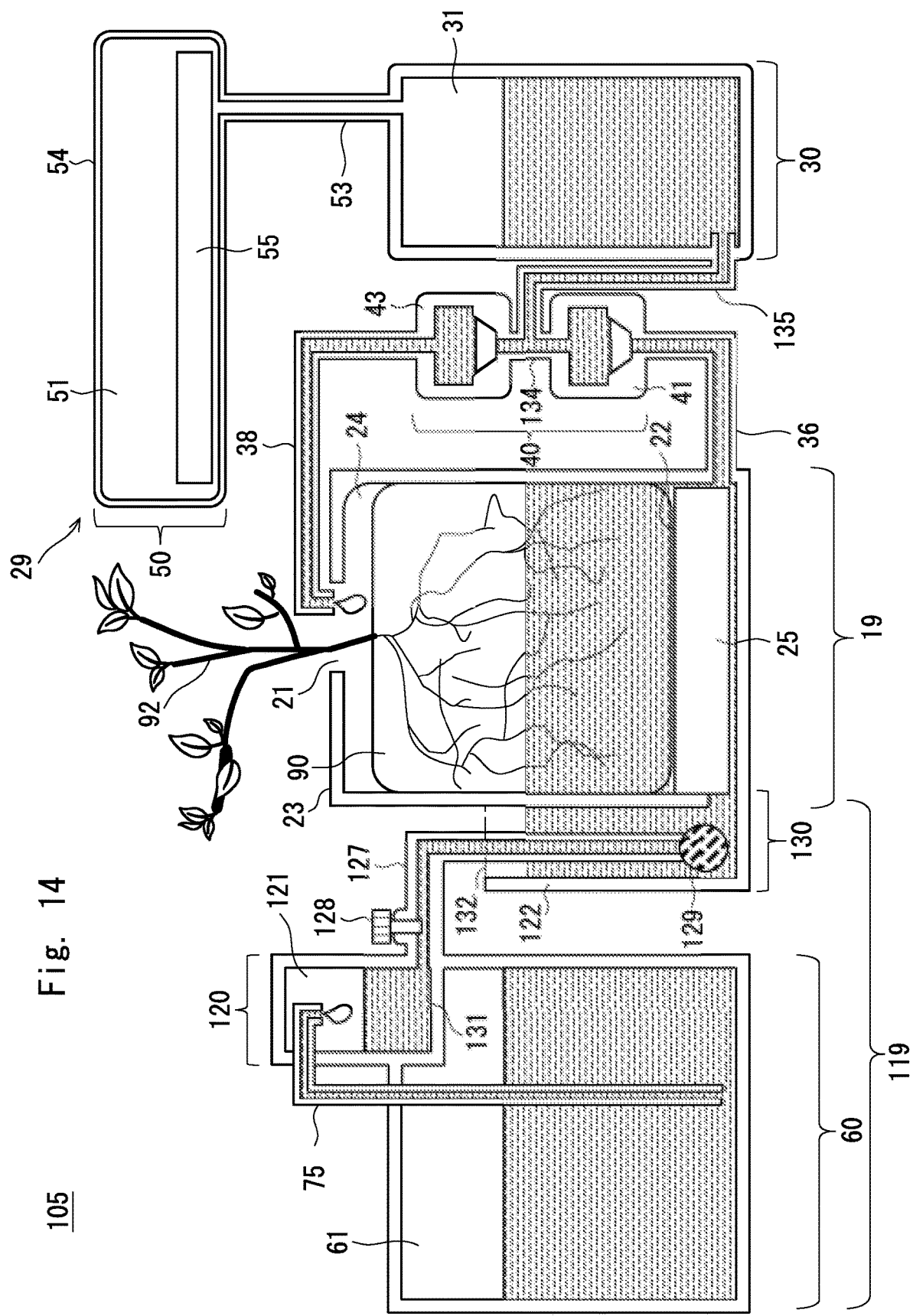
FIG. 14 is a schematic diagram of a plant cultivation device according to Examples 5 and 6.

The device 105 shown in FIG. 14 is a plant cultivation device according to Examples 5 and 6. The device 105 has a water replenishing device 119 instead of the water replenishing device 59 in Examples 1 and 2 (FIGS. 2 and 4). The water replenishing device 119 has the same structure as that of the water replenishing device 59 except for the following points. The water replenishing device 119 further has a water storage part 130. The water storage part 130 connects to the filter material 25. The water storage part 130 replenishes water to the cultivation tank 19 via the filter material 25.

The water replenishing device 119 shown in FIG. 14 has a suction pressure part 120 and a water supply pipe 127. The suction pressure part 120 has the same structure as that of the suction pressure part 70 in Examples 1 and 2 (FIGS. 2 and 4) except for the following points. The suction pressure part 120 communicates with the water storage part 130 via the water supply pipe 127. The suction pressure part 120 can be formed integral with the water refill tank 60.

The suction pressure part 120 shown in FIG. 14 is positioned higher than the water storage part 130. Therefore, the suction pressure part 120 can feed water to the water storage part 130 by gravity. Preferably, the suction pressure part 120 has its bottom face 131 positioned higher than the upper face 132 of the water storage part 130. The suction pressure part 120 can be disposed in an upper section of the water refill tank 60. The suction pressure part 120 feeds water to the filter material 25 via the water storage part 130.

In FIG. 14, the water storage part 130 and the cultivation tank 19 are formed integral with each other. The water storage part 130 and the cultivation tank 19 are divided by the walls of the body part 23. The water storage part 130 and the cultivation tank 19 may be formed separate from each other. In this case, the water storage part 130 and the filter material 25 may be connected by another water supply pipe.

The suction pressure part 120 shown in FIG. 14 has a suction pressure chamber 121 inside. The suction pressure chamber 121 is equivalent to the suction pressure chamber 71 in Examples 1 and 2 (FIGS. 2, 4, and 8) except for the following points. The suction pressure chamber 121 communicates with the inner cavity of the water storage part 130 via the water supply pipe 127.

One end of the water supply pipe 127 shown in FIG. 14 connects to the suction pressure chamber 121. The other end of the water supply pipe 127 is positioned in the inner cavity of the water storage part 130. This other end is covered by a porous material 129. An adjuster 128 is attached to the water supply pipe 127. The adjuster 128 can have the same structure as that of the adjuster 78 in Examples 1 and 2 (FIGS. 2 and 4).

Example 6

FIG. 14 also shows the structure of the solar heat pump system according to Example 6. In the device 105, the pipe structure for connecting the pair of check valves 40 with the water tank 30 is different from that of Examples 1 and 2 in the following points. The device 105 includes a connection pipe 134 and a water inlet pipe 135. The connection pipe 134 is provided between the suction check valve 41 and the discharge check valve 43. The connection pipe 134 connects the suction check valve 41 and the discharge check valve 43.

One end of the water inlet pipe 135 connects to a middle portion of the connection pipe 134 shown in FIG. 14. The other end of the water inlet pipe 135 connects to the water tank 30. The water inlet pipe 135 has both functions of the water inlet pipes 35 and 37 in Examples 1 and 2. Namely, during watering, the water inlet pipe 135 feeds water from the water tank 30 to the connection pipe 134. When water is suctioned, the water inlet pipe 135 feeds water from the connection pipe 134 to the water tank 30.

As shown in FIG. 14, a pressure change of the water inside the water tank 30 that occurs when the water surface is pressed by the air tank 50 that functions as a heat-collecting part travels through the water inlet pipe 135 and the connection pipe 134. The suction check valve 41 is closed by the pressure of the water in the connection pipe 134, which is equal to the pressure of the water in the water tank 30, exceeding the pressure of the water in the water-sucking pipe 36. Thereby, the water-sucking pipe 36 is shut.

As shown in FIG. 14, the discharge check valve 43 is opened by the pressure of the water in the connection pipe 134, which is equal to the pressure of the water in the water tank 30, exceeding the pressure of the water in the watering channel 38. Thereby, the watering channel 38 is opened. As a result, the water inside the water tank 30 is fed to the cultivation tank 19 through the watering channel 38.

As shown in FIG. 14, a pressure change of the water inside the water tank 30 that occurs when the water level is raised by the air tank 50 that functions as a heat-collecting part travels through the water inlet pipe 135 and the connection pipe 134. The discharge check valve 43 is closed by the pressure of the water in the connection pipe 134, which is equal to the pressure of the water in the water tank 30, falling below the pressure of the water in the watering channel 38. Thereby, the watering channel 38 is shut.

As shown in FIG. 14, the suction check valve 41 is opened by the pressure of the water in the connection pipe 134, which is equal to the pressure of the water in the water tank 30, falling below the pressure of the water in the water-sucking pipe 36. Thereby, the water-sucking pipe 36 is opened. As a result, the water is fed from the cultivation tank 19 to the water tank 30 through the water-sucking pipe 36 in accordance with the rising of the water inside the water tank 30.

Example 7

Figure 15:
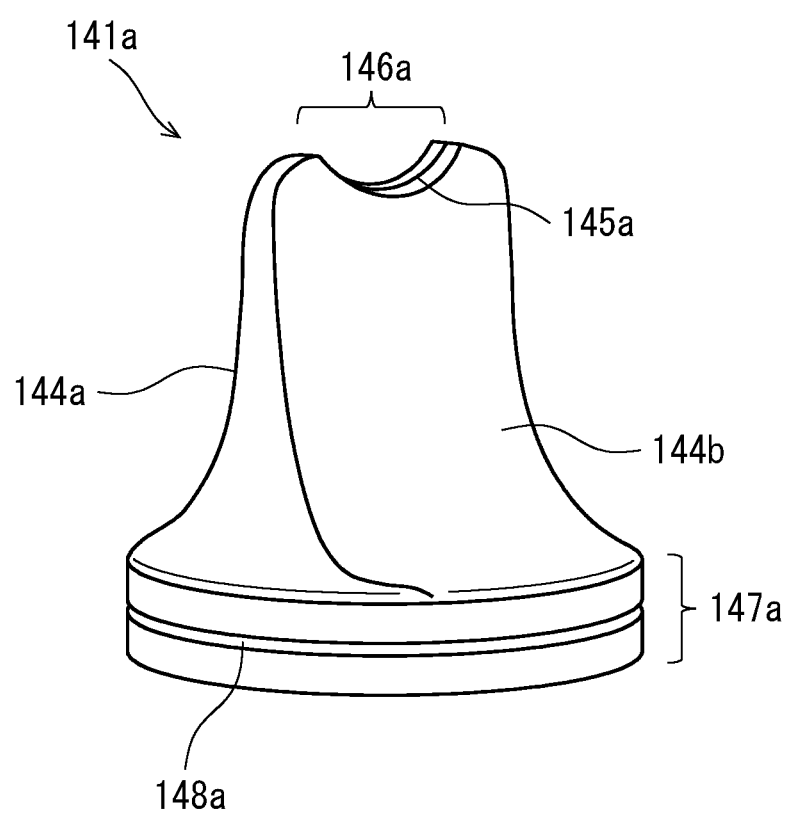
FIG. 15 is a perspective view of a check valve according to Example 7.

FIG. 15 shows a check valve according to Example 7. In this example, a duck bill or bill-shaped suction check valve 141a shown in FIG. 15 is used instead of the suction check valve 41 (FIG. 3) used in Examples 1 and 2. The valve member of the suction check valve 141a has two lips 144a and 144b that form a bill part. The bill part has a funnel-like shape that includes the lips 144a and 144b. A base part 147a is provided below the bill part. The base part 147a has a groove 148a.

The lips 144a and 144b shown in FIG. 15 have flexibility. The lips 144a and 144b are preferably made of rubber. The lips 144a and 144b are preferably curved inward of the valve member. This structure allows the distal ends of the lips 144a and 144b to make tight contact with each other easily.

The valve member of the suction check valve 141a shown in FIG. 15 has a slit 145a and a notch 146a. The slit 145a and the notch 146a are both positioned on the upper side that is at the distal end of the bill part formed by the lips 144a and 144b. The notch 146a is positioned at the center on the upper side. The upper side is chamfered at both ends in an arc. The slit 145a is provided only in the notch 146a. Preferably, the notch 146a has an arcuate shape.

Figure 16:
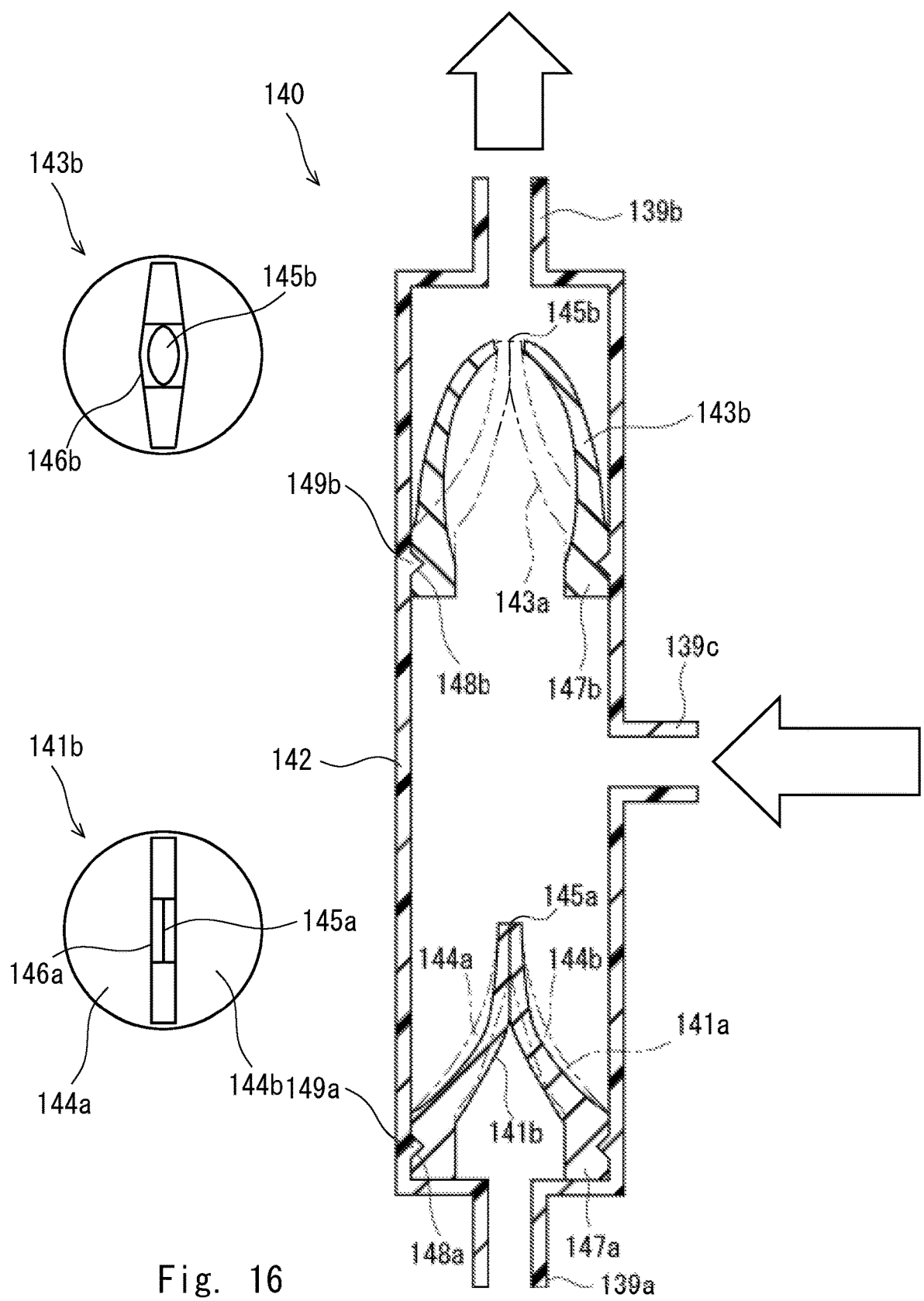
FIG. 16 is an end view of a pair of check valves according to Example 7.
Figure 17:
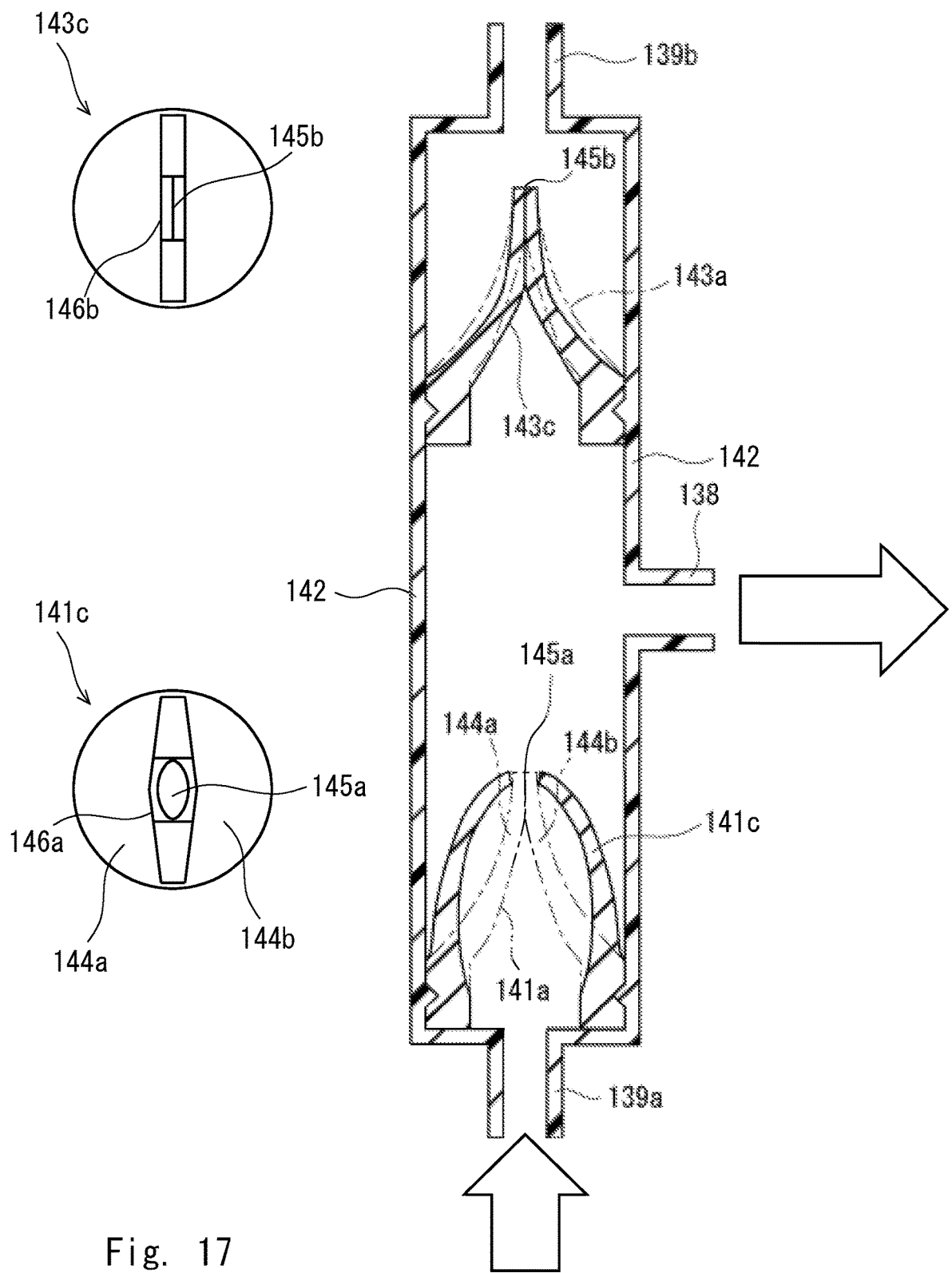
FIG. 17 is an end view of a pair of check valves according to Example 7.

FIGS. 16 and 17 show a pair of check valves 140 according to Example 7. The pair of check valves 140 has a suction check valve 141a and a discharge check valve 143a.

The discharge check valve 143a has the same structure as that of the suction check valve 141a.

A housing 142 shown in FIGS. 16 and 17 is used for disposing the pair of check valves 140 at predetermined positions inside the pump. The housing 142 has openings 139a to 139c. The opening 139a and opening 139b are provided at one end and the other end of the housing 142, respectively. The opening 139c is provided in a body part of the housing 142. The body part of the housing 142 functions as the connection pipe 134 (FIG. 14) in Example 6. The pair of check valves 140 and housing 142 can be replaced as one integral unit.

The suction check valve 141a and discharge check valve 143a shown in FIGS. 16 and 17 are attached in the inner cavity of the housing 142. The bill part of the suction check valve 141a is oriented to the center of the housing 142. The bill part of the suction check valve 141a is oriented to the opening 139b.

The housing 142 shown in FIGS. 16 and 17 has protrusions 149a and 149b in the inner cavity. The groove 148a is fitted with the protrusion 149a. The groove 148b of the discharge check valve 143a is fitted with the protrusion 149b. The base part 147a, and the base part 147b of the discharge check valve 143a, make tight contact with these protrusions to stop water leaks.

FIGS. 16 and 17 show the shape of the suction check valve 141a and discharge check valve 143a when the water pressure is balanced, or when no water pressure is being applied (hereinafter referred to as stationary state). In this state, the slit 145a and the slit 145b of the discharge check valve 143a are preferably closed.

As shown in FIGS. 16 and 17, the lips 144a and 144b of the suction check valve 141a preferably become thinner toward the distal ends. This structure allows the distal ends of the lips 144a and 144b to make tight contact with each other easily. The same applies to the lips of the discharge check valve 143a.

In FIG. 16, the pressure of the water whose surface has been pressed by the heat-collecting part inside the water tank is exceeding the pressure of the water inside the water-sucking pipe and in the watering channel Namely, the water pressure in the body part of the housing 142 is relatively raised. At this time, the bill part of the suction check valve 141a deforms to make a sharp angle at the distal end as indicated with reference numeral 141b. Thus the slit 145a is closed even more tightly than in the stationary state. Therefore, the water-sucking pipe connecting to the opening 139a is shut.

Meanwhile, the bill part of the discharge check valve 143a shown in FIG. 16 expands so that the distal end is rounded as indicated with reference numeral 143b. Thus the slit 145b opens in conformity to the shape of the notch 146b. Since the notch 146b has an arcuate shape, a hole having an oval cross section is formed. The watering channel connecting to the opening 139b is thus opened. As a result, the water inside the water tank is fed to the cultivation tank through the opening 139c, opening 139b, and watering channel.

In FIG. 17, the pressure of the water whose surface has been pressed by the heat-collecting part inside the water tank is below the pressure of the water inside the water-sucking pipe and in the watering channel. Namely, the water pressure in the body part of the housing 142 is relatively lowered. At this time, the bill part of the discharge check valve 143a deforms to make a sharp angle at the distal end as indicated with reference numeral 143c. Thus the slit 145b is closed even more tightly than in the stationary state. The watering channel connecting to the opening 139b is thus shut.

Meanwhile, the bill part of the suction check valve 141a shown in FIG. 17 expands so that the distal end is rounded as indicated with reference numeral 141c. Thus the slit 145a opens in conformity to the shape of the notch 146a. Since the notch 146a has an arcuate shape, a hole having an oval cross section is formed. Therefore, the water-sucking pipe connecting to the opening 139a is opened. As a result, the water is fed from the cultivation tank to the water tank through the water-sucking pipe, opening 139a, and opening 139c in accordance with the rising of the water inside the water tank.

Figure 18:
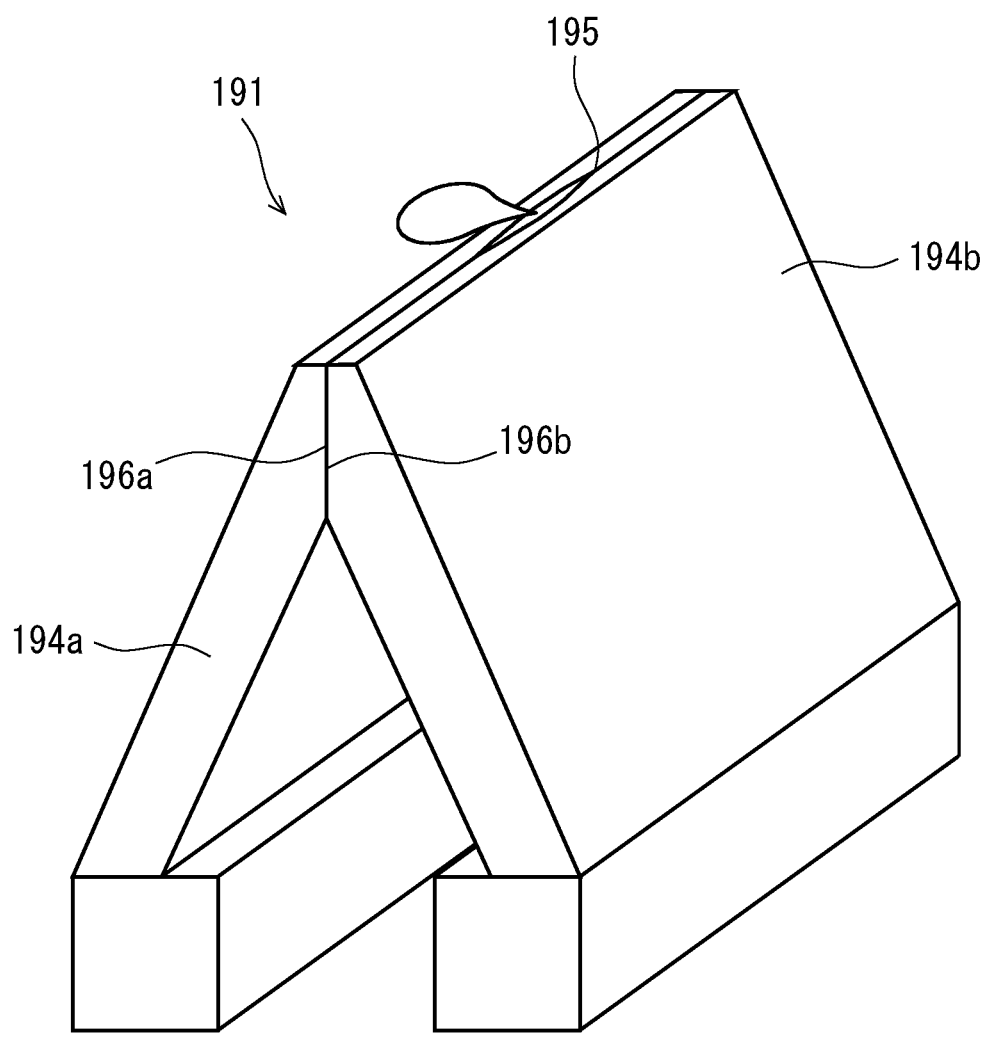
FIG. 18 is a schematic diagram of a check valve according to a reference example.

FIG. 18 schematically shows a check valve 191 according to a reference example. The check valve 191 has lips 194a and 194b that form a bill part. The lips 194a and 194b have straight upper sides. Abutment surfaces 196a and 196b are formed at the tips of the lips 194a and 194b. The abutment surfaces 196a and 196b form a slit 195 of the check valve 191.

The abutment surfaces 196a and 196b shown in FIG. 18 are in tight contact with each other. In conformity therewith, the slit 195 is formed widely on the upper side of the bill part 194. However, water passes such as to leak through between the abutment surfaces 196a and 196b. Accordingly, the loss of water pressure is large. In particular, since it is not actively planned to open the slit 195 by a suction pressure from outside of the bill shape, the slit does not easily open when suctioning water.

In comparison to the reference example described above, the check valve of the example is characteristic in that it has a notch in an arcuate shape. Because of this, a large hole is formed in the upper side of the check valve when the slit opens. The lips that form the bill part are curved, and become progressively thinner toward the distal ends. When the slit is closed, the lips therefore make tight contact with each other in the vicinity of the notch to shut the hole. Accordingly, the degree of resistance against water flow is changed significantly between when the hole is open and when it is closed.

The check valve of the example responds quickly and operates uniformly when it opens because of a pressure reduction outside the bill part, or when it opens because of a pressure rise inside the bill part, or when it closes because of a pressure rise outside the bill part, or when it closes because of a pressure reduction inside the bill part. Thus check valves of the same structure can be favorably used for both suction check valve and discharge check valve.

The duckbill check valve of the example has better open/close accuracy as compared to the gravity check valves described in Examples 1 and 2. In other words, they can open and close highly accurately without depending on the processing precision of the valve member and the like. Even if foreign substances get stuck in the check valves, they can still maintain their open/close accuracy. Therefore, they are also suited to applications where a bed of nitrifying bacteria is introduced to the water tank 30, for example. Since the check valve does not use gravity, there are no variations in opening and closing operations between when water is irrigated and when water is suctioned. Since the check valve does not use gravity, the open/close accuracy does not depend on the attachment accuracy of the check valve. The check valve can be produced easily as a resin or rubber molded product. The type or structure of the check valve is not limited as long as the solar heat pump system operates normally Namely, both gravity check valves and duckbill check valves can be used favorably.

Example 8

Figure 19:
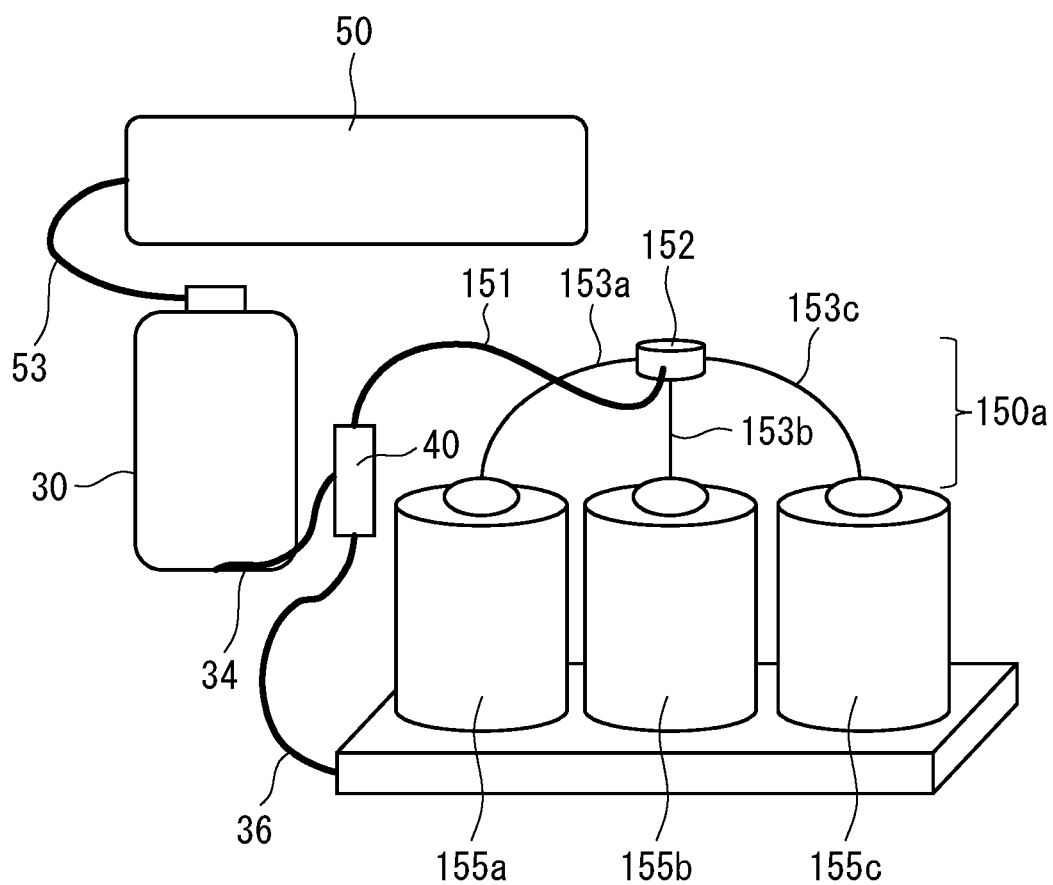
FIG. 19 is a schematic diagram of a plant cultivation device according to Example 8.

FIG. 19 shows a device 106, which is a plant cultivation device according to Example 8. The device 106 includes two or more cultivation tanks. In the drawing, the device 106 includes three cultivation tanks 155a to 155c. The cultivation tanks 155a to 155c each have the same structure as that of the cultivation tank 19 (FIGS. 2 and 4) described in Examples 1 and 2.

The device 106 shown in FIG. 19 includes a watering channel 150a. The watering channel 150a has the following characteristics in addition to those of the watering channel 38 (FIGS. 2 and 4) in Examples 1 and 2. The watering channel 150a is a duct that has a distributer 152. A main passage 151 and three branch passages 153a to 153c connect to the distributer 152. The water flowing through the watering channel 150a is divided by the distributer.

The branch passages 153a to 153c shown in FIG. 19 lead to respective culture medium materials in the cultivation tanks 155a to 155c. The watering channel 150 is branched so as to distribute water to each of the cultivation tanks 155a to 155c. The watering channel 150a enables supplying of water to a plurality of cultivation tanks with one solar heat pump system. This example is suited to applications where use of a plurality of relatively small cultivation tanks is desirable.

Example 9

Figure 20:
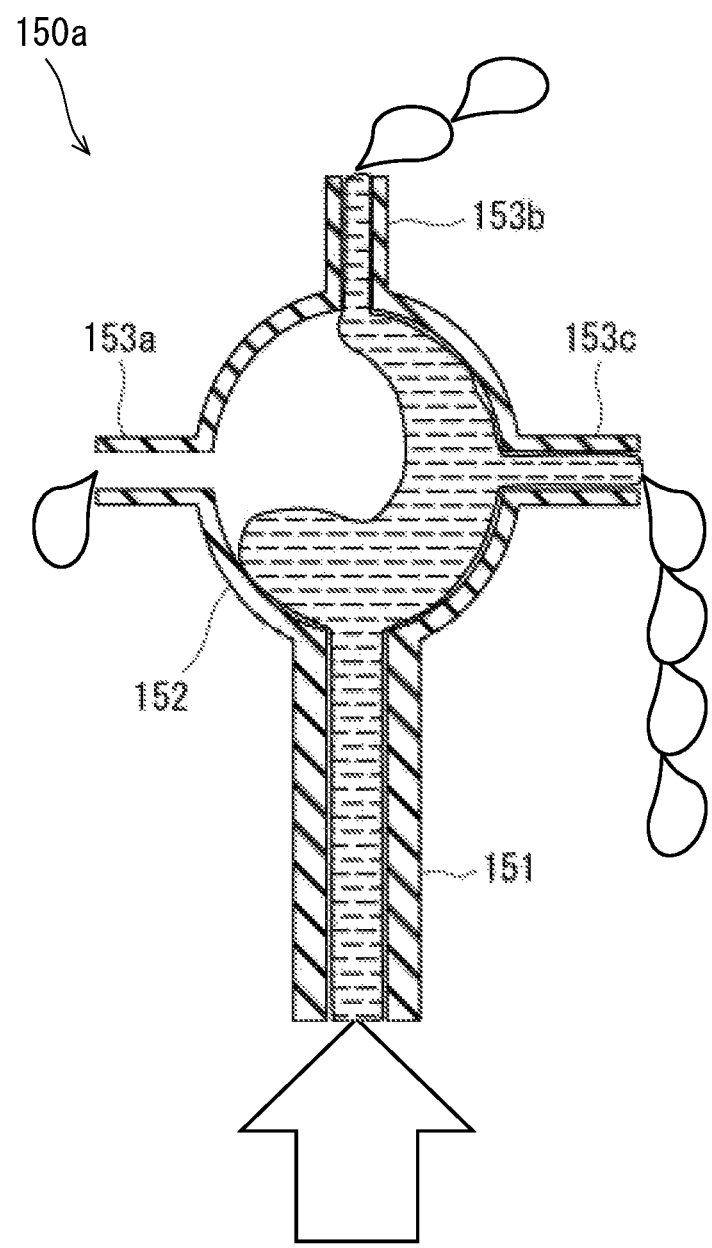
FIG. 20 is an end view of a watering channel according to Example 8.

FIG. 20 shows a cross-sectional end face of the watering channel 150a of Example 8 described above. As mentioned above, there is a time when no water flows through the watering channel 150a. Thus the water is left inside the distributer 152 as an irregular-shaped pool of water or water drops. This pool of water causes unevenness in the water flow of the next time watering due to the strong surface tension of water. Because of this, sometimes it is difficult to distribute water evenly to each of the branch passages 153a to 153c.

Figure 21:
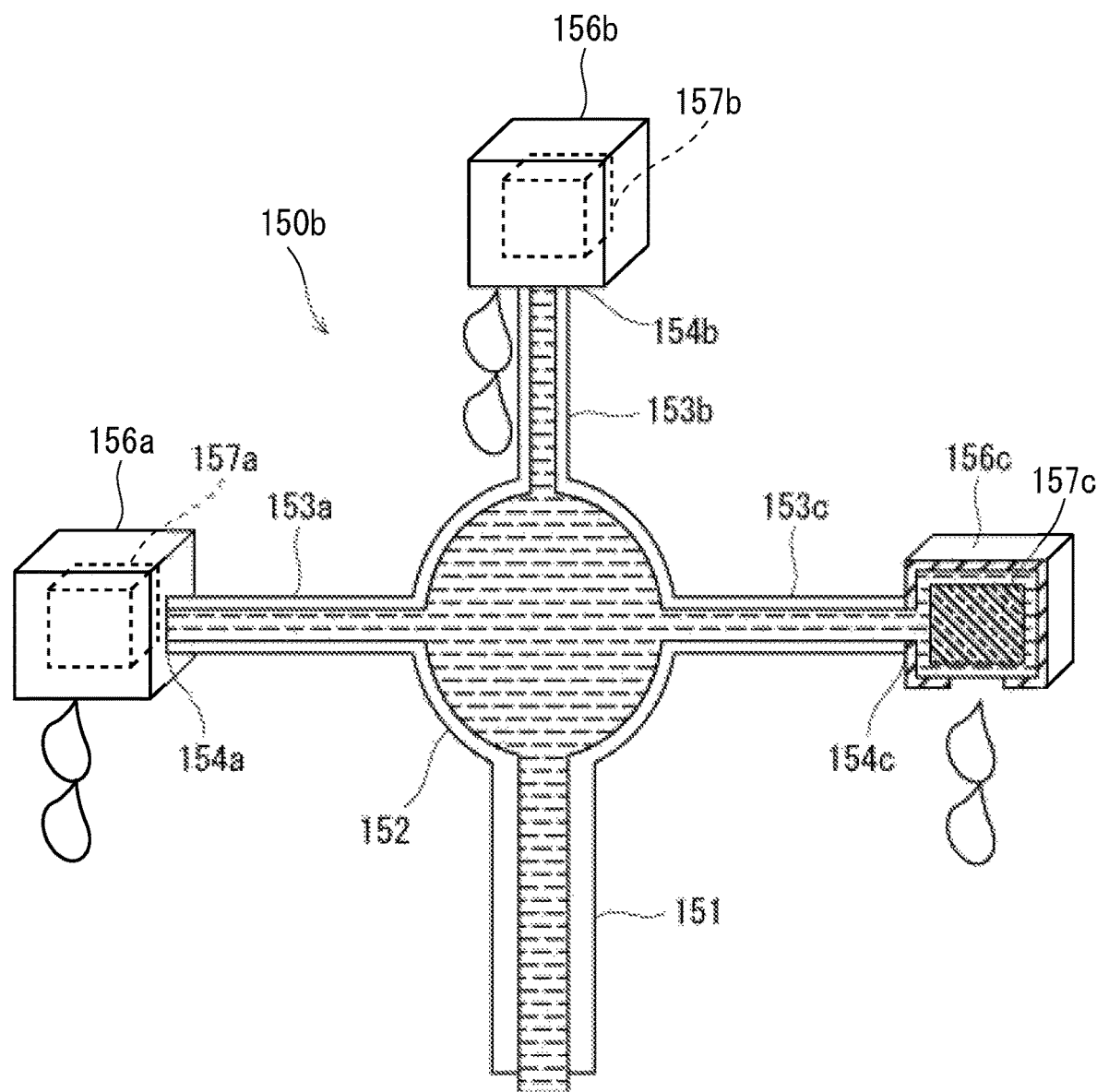
FIG. 21 is a partial cross-sectional view of a watering channel according to Example 9.

FIG. 21 shows a watering channel 150b according to Example 9. The watering channel 150b is different from the watering channel 150a (FIG. 20) in the following point. Sponges 157a to 157c are mounted to discharge ports 154a to 154c on the cultivation tank side of the branch passages 153a to 153c of the watering channel 150b. More specifically, water storage chambers 156a to 156c that have a larger cross-sectional area than that of the discharge ports 154a to 154c are provided. The sponges 157a to 157c are disposed in each of the water storage chambers 156a to 156c.

The sponge 157c is appearing in the cross section of the water storage chamber 156c shown in FIG. 21. As the water-impregnated sponge 157c serves as a plug, the watering channel 150 including the distributer 152 is always filled with water. Formation of water pools in the distributer 152 is thus prevented. The watering channel 150b is suited to uniform distribution of water to the branch passages 153a to 153c. The loss of the pressure generated by the solar heat pump system caused by the sponges 157a to 157c is small. Therefore they hardly affect the total flow rate of water.

Example 10

Figure 22:
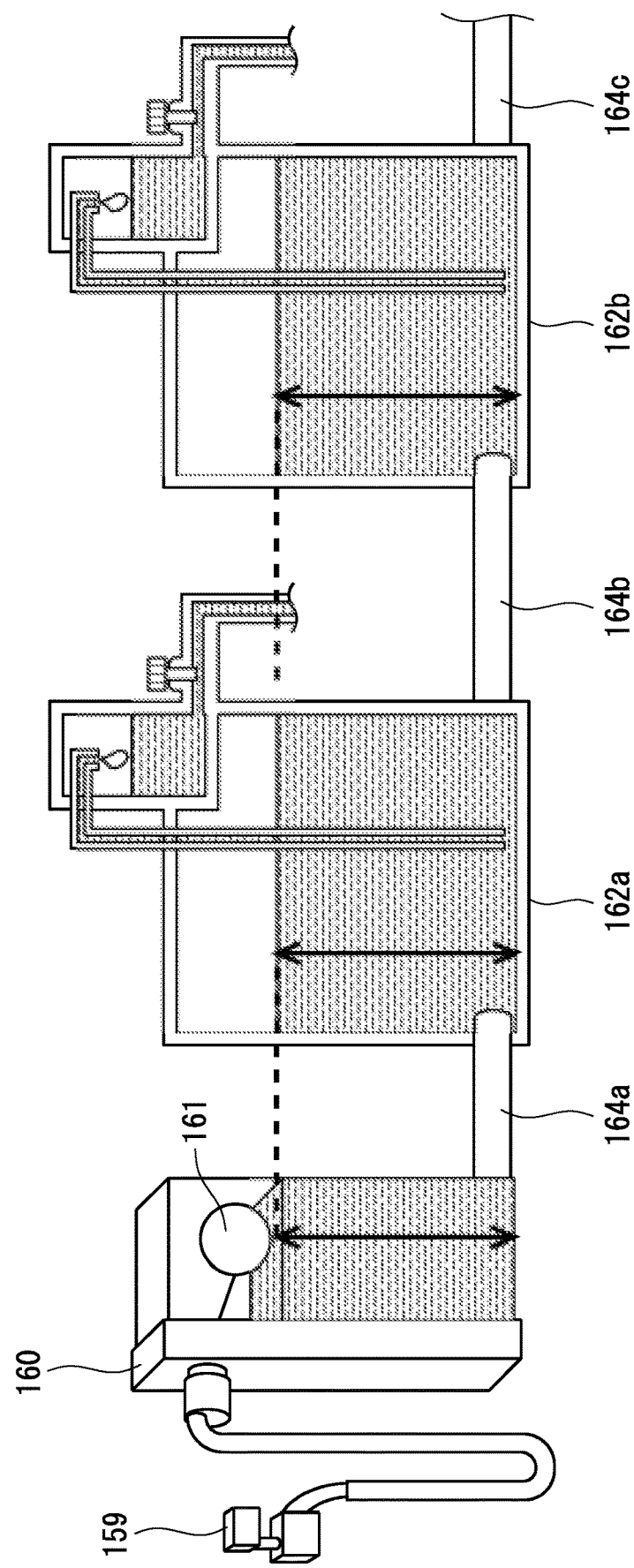
FIG. 22 is a schematic diagram of a plant cultivation device according to Example 10.

FIG. 22 shows a device 107, which is a plant cultivation device according to Example 10.

The device 107 includes a water feeder 160. The water feeder 160 communicates with the water refill tank 162a of the water replenishing device via a drain 164a. The water refill tank 162a is the same as the water refill tank 60 (FIGS. 2, 4, and 14) shown in Examples 1, 2, and 5.

The water feeder 160 shown in FIG. 22 includes a ballcock 161. The ballcock 161 is connected to a water supply 159. The water feeder 160 can keep the water level constant inside the water refill tank 162a by means of the ballcock 161.

The device 107 shown in FIG. 22 further includes another water replenishing device. The other water replenishing device includes a water refill tank 162b. The water refill tank 162b communicates with the water refill tank 162a via a drain 164b. Namely, the water refill tank 162b indirectly communicates with the water feeder 160 via the water refill tank 162a. Thus water can be supplied to a plurality of water refill tanks 162a and 162b with one water feeder 160, and also the water level can be kept constant in these tanks. A series of water refill tanks can be connected together in a chain, using other drains including a drain 164c. The approach of this example wherein water refill tanks indirectly communicate with the water feeder is suited to larger scale plant cultivation devices.

Example 11

Figure 23:
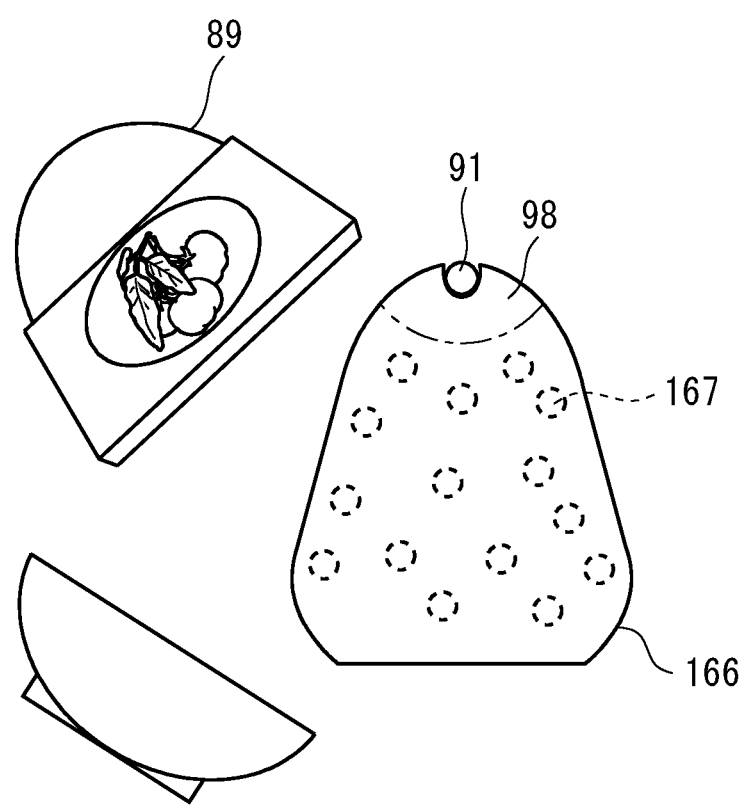
FIG. 23 is a schematic diagram of a culture medium material according to Example 11.

FIG. 23 shows a culture medium material 166. The culture medium material 166 has gel particles 167. The gel particles 167 contain fertilizer components. The gel particles 167 are dispersed in the culture medium material 166. The gel particles release the fertilizer components slowly over a long period of time. Fertilizer components include nitrogen, potassium, and the like. Gel particles are preferably made of gelatin.

While the present invention has been described with reference to embodiments, the present invention shall not be limited by the above description. Various changes that can be understood by a person skilled in the art can be made to the configurations and details of the present invention within the scope of the invention.

REFERENCE SIGNS LIST 17a to 17f Cultivation tank
18a, 18b Cultivation tank
19 Cultivation tank
20 Bottom section
21 Upper face opening
22 Upper face
23 Body part
24 Inner cavity
25 Filter material
26 Water level difference
27 Supporter
28a, 28b Supporter
29 Pump
30 Water tank
31 Inner cavity
32 Solar heat pump system
33 Sealing plug
35 Water inlet pipe
36 Water-sucking pipe
37 Water inlet pipe
38 Watering channel
39 Pump chamber
40 Pair of check valves
41 Suction check valve
42 Base
43 Discharge check valve
44a, 44b Valve member
45a, 45b Valve seat
46a, 46b Cover
47a, 47b Ring 48a, 48b Joint
50 Air tank
51 Inner cavity
52 Heat-collecting surface
53 Air feed pipe
54 Container
55 Heat-collecting body
56 Heat-collecting part
57 Air-storage part
59 Water replenishing device
60 Water refill tank
61 Inner cavity
62a to 62c Water refill tank
63 Refill port
64a to 64c Water supply passage
65 Discharge pipe
66a to 66c Discharge port
67 Water level indicator
68 Water level drop
69 Base
70 Suction pressure tank
71 Suction pressure chamber
72 Outer shell
73 Sealing plug
74 Air
75 Water refill tube
76 Opening
77 Water supply pipe
78 Adjuster
81 Pressure rise
82 Pressure reduction
83, 84 Water flow
85, 86 Pressure
87 Fresh air
88 Discharge
89 Capsule
90 Culture medium material
91 Seed
92 Seedling
93 Sunlight
94 Radiation heat
95 Young plant
96a to 96e Culture medium material
97a Upper part
97b Lower part
98 Seed receiving part
99, 100 to 102, 103a to 103c Device
105-107 Device
119 Water replenishing device
120 Suction pressure part
121 Suction pressure chamber
127 Water supply pipe
128 Adjuster
129 Porous material
130 Water storage part
131 Bottom face
132 Upper face
134 Connection pipe
135 Water inlet pipe
135 Water inlet pipe
139a to 139c Opening
140 Pair of check valves
141a to 141c Suction check valve
142 Housing
143a to 143c Discharge check valve
144a, 144b Lip
145a, 145b Slit
146a, 146b Notch
147a, 147b Base part
148a, 148b Groove
149a, 149b Protrusion
150 Watering channel
151 Main passage
152 Distributer
153a to 153c Branch passage
154a to 154c Discharge port
155a to 155c Cultivation tank
156a to 156c Water storage chamber
157a to 157c Sponge
159 Water supply
160 Water feeder
161 Ballcock
162a, 162b Water refill tank
164a to 164c Drain
166 Culture medium material
167 Gel particle
191 Check valve
194 Part
194a, 194b Lip
195 Slit
196a, 196b Abutment surface

The invention claimed is:
1. A plant cultivation device, comprising:
a pump system;
a watering channel;
a cultivation tank for growing a plant; and
a water-sucking pipe, wherein cultivation water circulates through the pump system, the watering channel, the cultivation tank, and then the water-sucking pipe,
wherein the pump system includes:
an airtight pump chamber that includes a water tank for supplying cultivation water to the cultivation tank via the watering channel and for suctioning the cultivation water from the cultivation tank via the water-sucking pipe,
a heat-collecting part having an air-storage part that communicates with an upper section of the water tank,
a discharge check valve that prevents backflow of the cultivation water supplied from the water tank to the cultivation tank, and
a suction check valve that prevents backflow of the cultivation water suctioned from the cultivation tank to the water tank,
wherein the pump system repeats alternately, supplying the cultivation water from the water tank to the cultivation tank and suctioning the cultivation water from the cultivation tank to the water tank,
when the pump system supplies the cultivation water from the water tank to the cultivation tank, the heat-collecting part receives sunlight and causes pressure of air heated inside the air-storage part to press a surface of water inside the water tank, and the water tank supplies the cultivation water that has been pressed by the heated air to a culture medium material arranged inside the cultivation tank from above through the watering channel,
when the pump system suctions the cultivation water from the cultivation tank to the water tank, the heat-collecting part causes the surface of water inside the water tank to be raised as a result of cooling the heated air caused by a decrease of the sunlight, and the water tank suctions the cultivation water from a bottom section of the cultivation tank via the water-sucking pipe in accordance with rising of the cultivation water, and wherein the water-sucking pipe is shut by the suction check valve being closed by a pressure of the cultivation water whose surface has been pressed by the heat-collecting part inside the water tank exceeding a pressure of the cultivation water inside the water-sucking pipe, the watering channel is opened by the discharge check valve being opened by a pressure of the cultivation water whose surface has been pressed by the heat-collecting part inside the water tank exceeding a pressure of the cultivation water inside the watering channel, and thereby, the cultivation water in the water tank is fed to the cultivation tank through the watering channel, the watering channel is shut by the discharge check valve being closed by a pressure of the cultivation water whose surface has been raised by the heat-collecting part inside the water tank falling below a pressure of the cultivation water inside the watering channel, and the water-sucking pipe is opened by the suction check valve being opened by a pressure of the cultivation water whose surface has been raised by the heat-collecting part inside the water tank falling below a pressure of the cultivation water inside the water-sucking pipe, and thereby, the cultivation water is fed from the cultivation tank through the water-sucking pipe in accordance with rising of the cultivation water in the water tank.

2. The plant cultivation device according to claim 1, wherein each of the discharge check valve and the suction check valve comprise a valve member having a flexible bill part, the flexible bill part comprises a slit on an upper side at a distal end of the flexible bill part, the water-sucking pipe is shut by the slit of the suction check valve being closed, the watering channel is opened by the slit of the discharge check valve being opened, the watering channel is shut by the slit of the discharge check valve being closed, and the water-sucking pipe is opened by the slit of the suction check valve being opened.

3. The plant cultivation device according to claim 2, wherein the watering channel is a duct that has branches and distributes water to the cultivation tanks by branching, and a sponge is mounted at each of discharge ports of the branched duct that leads to the cultivation tank.

4. The plant cultivation device according to claim 1, wherein the discharge check valve and the suction check valve, each includes a valve member having a downwardly tapered conical shape and a specific gravity larger than the cultivation water, and a valve seat having a downwardly tapered funnel-like shape conforming to a shape of the valve member, the water-sucking pipe is shut by the valve member and the valve seat of the suction check valve making surface contact with each other due to gravity, and by a pressure of the cultivation water whose surface has been pressed by the heat-collecting part inside the water tank exceeding a pressure of the cultivation water inside the water-sucking pipe, the watering channel is opened by the valve member and the valve seat of the discharge check valve separating from each other by a pressure of the cultivation water whose surface has been pressed by the heat-collecting part inside the water tank exceeding a pressure of the cultivation water inside the watering channel, and consequently, the cultivation water in the water tank is fed to the cultivation tank through the watering channel, the watering channel is shut by the valve member and the valve seat of the discharge check valve making surface contact with each other due to gravity, and by a pressure of the cultivation water whose surface has been raised by the heat-collecting part inside the water tank falling below a pressure of the cultivation water inside the watering channel, and the water-sucking pipe is opened by the valve member and the valve seat of the suction check valve separating from each other by a pressure of the cultivation water whose surface has been raised by the heat-collecting part inside the water tank falling below a pressure of the cultivation water inside the water-sucking pipe, and consequently, the cultivation water is fed from the cultivation tank through the water-sucking pipe in accordance with rising of the cultivation water in the water tank.

5. The plant cultivation device according to claim 4, wherein the discharge check valve and the suction check valve are positioned outside the water tank and detachable for the watering channel and the water-sucking pipe.

6. The plant cultivation device according to claim 4, wherein the discharge check valve and the suction check valve, each further includes a cover and a base, the base having the valve seat, the valve member being disposed between the cover and the valve seat, the cover and the base having threads, and threads of the cover capable of being removed and mated with threads of the base.

7. The plant cultivation device according to claim 1, further comprising a water replenishing device that replenishes the cultivation water to the cultivation tank via a filter material arranged in the bottom section of the cultivation tank, wherein the water replenishing device includes a water refill tank that stores the cultivation water, a suction pressure part that replenishes the cultivation water to the cultivation tank via the filter material, and a water refill tube that feeds the cultivation water stored in the water refill tank into an upper space of the suction pressure part, the cultivation water in the water refill tank being fed into the upper space of the suction pressure part by a drop of water level in the suction pressure part caused by replenishment of the cultivation water by the suction pressure part.

8. The plant cultivation device according to claim 7, wherein the suction pressure part is a separate body from the cultivation tank.

9. The plant cultivation device according to claim 7, wherein the suction pressure part and the cultivation tank are integrated, sharing walls, and the filter material extends to a bottom section of the suction pressure part.

10. The plant cultivation device according to claim 7, wherein a plurality of the water refill tanks are arranged stepwise so that a water level difference occurs between one of the water refill tanks and another of the water refill tanks, and an upper-side water refill tank is provided with a water supply means for supplying the cultivation water in the upper-side water refill tank to a lower-side water refill tank.

11. The plant cultivation device according to claim 7, wherein the water replenishing device further includes an adjuster provided to the water refill tube, and the adjuster adjusts flow rate of the cultivation water inside the water refill tube.

12. The plant cultivation device according to claim 7, wherein the cultivation tank further includes a supporter that is arranged inside the cultivation tank and supports the culture medium material, and the supporter has an upwardly or downwardly tapered funnel-like shape to form a space between the filter material and a bottom part of the culture medium material.

13. The plant cultivation device according to claim 1, further comprising:

two or more cultivation tanks for growing the plant;

one heat-collecting part communicating with the two or more cultivation tanks; and an air feed pipe through which the heat-collecting part communicates with the water tank, through which pressure of air that has been heated by the heat-collecting part transmits, and through which pressure of the air that has been cooled by the heat-collecting part transmits, wherein the heat-collecting part conveys a change of the pressure of the heated air to the water tank through the air feed pipe to cause the surface of water in the water tank to be pressed by pressure of the heated air, and the heat-collecting part conveys a change of the pressure of the cooled air to the water tank through the air feed pipe to cause the surface of water in the water tank to be raised by pressure of the cooled air.

14. The plant cultivation device according to claim 1, wherein the heat-collecting part includes a heat-collecting body positioned inside the air-storage part.

15. The plant cultivation device according to claim 1, wherein the culture medium material has an upwardly tapered conical shape, the culture medium material has restorability in a direction in which a distal end of the conical shape appears above the water surface when the culture medium material is floating on the cultivation water, the distal end has a seed receiving part where a seed of the plant is embedded, and the culture medium material expands when immersed in the cultivation water.

16. The plant cultivation device according to claim 1, further comprising a water replenishing device that replenishes the cultivation water to the cultivation tank via a filter material arranged in the bottom section of the cultivation tank, wherein the water replenishing device includes a water refill tank that stores the cultivation water, a water storage part that replenishes the cultivation water to the cultivation tank via the filter material, a suction pressure part that communicates with the water storage part and is positioned higher than the water storage part so as to feed the cultivation water to the water storage part by gravity, and a water refill tube that feeds the cultivation water stored in the water refill tank into an upper space of the suction pressure part, the cultivation water in the water refill tank being fed into the upper space of the suction pressure part by a drop of water level in the suction pressure part caused by replenishment of the cultivation water by the suction pressure part.

17. The plant cultivation device according to claim 1, further comprising:

a connection pipe that connects the discharge check valve and the suction check valve; and a water inlet pipe that connects a middle portion of the connection pipe with the water tank.

18. The plant cultivation device according to claim 1, wherein the discharge check valve and the suction check valve are each formed of a valve member having a flexible bill part, the flexible bill part has a slit and a notch on an upper side at a distal end of the flexible bill part, the slit is provided only in the notch positioned at a center of the upper side, the water-sucking pipe is shut by the slit of the suction check valve being closed by a pressure of the cultivation water whose surface has been pressed by the heat-collecting part inside the water tank exceeding a pressure of the cultivation water inside the water-sucking pipe, the watering channel is opened by the slit of the discharge check valve being opened by a pressure of the cultivation water whose surface has been pressed by the heat-collecting part inside the water tank exceeding a pressure of the cultivation water inside the watering channel, and consequently, the cultivation water in the water tank is fed to the cultivation tank through the watering channel, the watering channel is shut by the slit of the discharge check valve being closed by a pressure of the cultivation water whose surface has been raised by the heat-collecting part inside the water tank falling below a pressure of the cultivation water inside the watering channel, and the water-sucking pipe is opened by the slit of the suction check valve being opened by a pressure of the cultivation water whose surface has been raised by the heat-collecting part inside the water tank falling below a pressure of the cultivation water inside the water-sucking pipe, and consequently, the cultivation water is fed from the cultivation tank through the water-sucking pipe in accordance with rising of the cultivation water in the water tank.

19. The plant cultivation device according to claim 1, further comprising two or more cultivation tanks for growing the plant, wherein the watering channel is a duct that has branches and distributes water to each of the two or more cultivation tanks by branching; and a sponge mounted at a discharge port of the watering channel that leads to the cultivation tank.

20. The plant cultivation device according to claim 1, further comprising a water replenishing device that replenishes the cultivation water to the cultivation tank via a filter material arranged in the bottom section of the cultivation tank, wherein
the water replenishing device includes
a water refill tank that stores the cultivation water,
a suction pressure part that feeds the cultivation water to the cultivation tank via the filter material, and
a water refill tube that feeds the cultivation water stored in the water refill tank into an upper space of the suction pressure part,
the cultivation water in the water refill tank being fed into the upper space of the suction pressure part by a drop of water level in the suction pressure part caused by replenishment of the cultivation water by the suction pressure part,
the plant cultivation device further comprising a water feeder that communicates with the water refill tank and supplies the cultivation water to the water replenishing device,
the water feeder having a ballcock.

21. The plant cultivation device according to claim 20, further comprising another water replenishing device, wherein
the water refill tank of the other water replenishing device communicates indirectly with the water feeder via the water refill tank that communicates with the water feeder.

22. The plant cultivation device according to claim 1, wherein the culture medium material includes gel particles containing a fertilizer component.

23. A method for plant cultivation by a plant cultivation device that comprises a pump system and a cultivation tank for growing a plant wherein the pump system includes a watering channel, a water-sucking pipe connected with the cultivation tank, a water tank connected with the watering channel, the water-sucking pipe, and an airtight pump chamber that includes the water tank, a heat-collecting part that has an air-storage part and communicates with an upper section of the water tank, the method comprising:
providing cultivation water in the water tank;
maintaining air in the air-storage part;
receiving sunlight by the heat-collecting part to change a temperature of the air;
causing a change in a pressure of the air by changing the temperature of the air;
supplying the cultivation water from the water tank to the cultivation tank when the pressure of the air increases and pushes a surface of the cultivation water in the water tank;
suctioning the cultivation water from the cultivation tank to the water tank via the water-sucking pipe when the pressure of the air decreases and raises a surface of the cultivation water in the water tank;
closing a suction check valve interposed in the water-sucking pipe by a pressure of the cultivation water in the water tank and preventing a backflow of the cultivation water suctioned from the cultivation tank to the water tank by the closed suction check valve when the pressure of the cultivation water in the water tank exceeds the pressure of cultivation water in the water-sucking pipe;
opening the suction check valve by the pressure of the cultivation water in the water-sucking pipe when the pressure of the cultivation water in the water tank is lower than the pressure of the cultivation water in the water-sucking pipe;
closing a discharge check valve interposed in the watering channel by a pressure of the cultivation water in the watering channel and preventing a backflow of the cultivation water from the water tank to the cultivation tank by the closed discharge check valve when the pressure of the cultivation water in the water tank is lower than the pressure of the cultivation water in the watering channel; and
opening the discharge check valve by the pressure of the cultivation water in the water tank when the pressure of the cultivation water in the water tank exceeds the pressure of cultivation water in the watering channel.

24. A plant cultivation device, comprising:
a pump system; and
a cultivation tank for growing a plant,
wherein the pump system includes:
a watering channel,
a water-sucking pipe connected with the cultivation tank,
a water tank connected with the watering channel and the water-sucking pipe wherein the water tank supplies cultivation water to the cultivation tank via the watering channel and receives the cultivation water suctioned from the cultivation tank via the water-sucking pipe,
an airtight pump chamber that includes the water tank,
a heat-collecting part that has an air-storage part that includes air, receives sunlight, changes a temperature of the air with the received sunlight, causes a change in a pressure of the air by changing the temperature of the air, and communicates with an upper section of the water tank,
a discharge check valve interposed in the watering channel, and
a suction check valve interposed in the water-sucking pipe,
wherein the pump system alternately repeats:
supplying the cultivation water from the water tank to the cultivation tank when the pressure of the air increases and pushes a surface of the cultivation water in the water tank, and
suctioning the cultivation water from the cultivation tank to the water tank via the water-sucking pipe when the pressure of the air decreases and raises a surface of the cultivation water in the water tank,
wherein the suction check valve is closed by a pressure of the cultivation water in the water tank and prevents a backflow of the cultivation water suctioned from the cultivation tank to the water tank when the pressure of the cultivation water in the water tank exceeds the pressure of cultivation water in the water-sucking pipe,
the discharge check valve is opened by a pressure of the cultivation water in the water tank when the pressure of the cultivation water in the water tank exceeds the pressure of cultivation water in the watering channel,
the discharge check valve is closed by the pressure of the cultivation water in the watering channel and prevents a backflow of the cultivation water from the water tank to the cultivation tank when the pressure of the cultivation water in the water tank is lower than the pressure of the cultivation water in the watering channel, and
the suction check valve is opened by the pressure of the cultivation water in the water-sucking pipe when the pressure of the cultivation water in the water tank is lower than the pressure of the cultivation water in the water-sucking pipe.

* * * * *